United States Patent
Kinoshita et al.

(10) Patent No.: US 9,830,183 B2
(45) Date of Patent: Nov. 28, 2017

(54) DATA CENTER RESOURCE ALLOCATION SYSTEM AND DATA CENTER RESOURCE ALLOCATION METHOD

(71) Applicant: Hitachi, Ltd., Tokyo (JP)

(72) Inventors: Junji Kinoshita, Tokyo (JP); Osamu Takada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 144 days.

(21) Appl. No.: 14/623,682

(22) Filed: Feb. 17, 2015

(65) Prior Publication Data
US 2015/0244643 A1    Aug. 27, 2015

(30) Foreign Application Priority Data
Feb. 21, 2014  (JP) ................. 2014-031435

(51) Int. Cl.
G06F 15/173   (2006.01)
G06F 9/455    (2006.01)
H04L 12/24    (2006.01)

(52) U.S. Cl.
CPC ...... G06F 9/45558 (2013.01); H04L 41/0896 (2013.01); *G06F 2009/45595* (2013.01); *H04L 41/0813* (2013.01); *H04L 41/0893* (2013.01)

(58) Field of Classification Search
CPC .. H04L 47/783; H04L 12/911; G06F 9/45558; G06F 2009/45595; G06F 9/455
(Continued)

(56) References Cited

U.S. PATENT DOCUMENTS 6,075,938 A       6/2000  Bugnion et al.
7,072,807 B2 *    7/2006  Brown ..................... G06F 8/20
                                                      703/1
(Continued)

FOREIGN PATENT DOCUMENTS

JP    2011-210032 A    10/2011
JP    2012-14674 A     1/2012
(Continued)

OTHER PUBLICATIONS

Kyle Gleed, vCloud Director 5.1.1 Release Notes, Software Defined Data Center in Minutes, Sep. 10, 2014, pp. 1-78.
(Continued)

*Primary Examiner* — S M Rahman
(74) *Attorney, Agent, or Firm* — Mattingly & Malur, PC

(57) ABSTRACT

A data center including: a data center infrastructure including at least one service network accessed by a terminal of a logical infrastructure user and a terminal of a resource user, at least one infrastructure network accessed by the terminal of the resource user, and at least one resource coupled to the service network and the infrastructure network; and a resource management apparatus for managing the infrastructure network, the service network, and the at least one resource, the resource management apparatus being configured to: generate, in response to a request, a logical service network, which is created by virtualizing the service network, a logical infrastructure network, which is created by virtualizing the infrastructure network, and a logical infrastructure in which the at least one resource is allocated to the logical service network and the logical infrastructure network; and provide the logical infrastructure to the terminal of the logical infrastructure user.

5 Claims, 30 Drawing Sheets

(58) Field of Classification Search
USPC .......................................................... 709/226
See application file for complete search history.

(56) References Cited

U.S. PATENT DOCUMENTS

| | | | |
|---|---|---|---|
| 9,092,248 B1 * | 7/2015 | Makin | .................. G06F 9/45558 |
| 9,692,707 B2 * | 6/2017 | Tang | ....................... H04L 47/70 |
| 2011/0246669 A1 | 10/2011 | Kanada et al. | |
| 2013/0058215 A1 | 3/2013 | Koponen et al. | |
| 2013/0185729 A1 * | 7/2013 | Vasic | .................... G06F 9/5072 |
| | | | 718/104 |
| 2013/0258901 A1 | 10/2013 | Kawai | |
| 2014/0025816 A1 | 1/2014 | Otani | |

FOREIGN PATENT DOCUMENTS

| | | |
|---|---|---|
| JP | 2013-152553 A | 8/2013 |
| JP | 2013-207784 A | 10/2013 |
| JP | 2014-23142 A | 2/2014 |

OTHER PUBLICATIONS

Japanese Office Action received in corresponding Japanese Application No. 2014-031435 dated Jun. 27, 2017 and concise explanation.

Iwata, A., "Software Design: OpenFlow, Part 1 ProgrammableFlow" Nov. 18, 2012, pp. 40-45.

Yokoyama, "ASCII Technologies: Hyper-V 2.0 VDI, Windows Server 2008 R2" Feb. 24, 2010, pp. 86-93.

* cited by examiner

601 RESOURCE MANAGEMENT TABLE

| RESOURCE ID (1000) | RESOURCE TYPE (1001) | RESOURCE USER ID (1002) |
|---|---|---|
| ... | ... | ... |
| RESOURCE m-1 | HOST COMPUTER | USER A |
| RESOURCE m-2 | HOST COMPUTER | USER B |
| RESOURCE m-3 | STORAGE | - |
| RESOURCE m-4 | APPLIANCE (PHYSICAL FIREWALL) | - |
| ... | ... | ... |
| RESOURCE n-1 | HOST COMPUTER | USER B |
| RESOURCE n-2 | HOST COMPUTER | USER A |
| RESOURCE n-3 | APPLIANCE (VIRTUAL LOAD LANCER) | - |
| ... | ... | ... |

*FIG. 6*

602 PHYSICAL NETWORK APPARATUS MANAGEMENT TABLE

| PHYSICAL NETWORK APPARATUS ID (1010) | TYPE (1011) | MANAGEMENT ADDRESS (1012) |
|---|---|---|
| ... | ... | ... |
| SERVICE NETWORK APPARATUS p | SERVICE | a.a.a.a |
| SERVICE NETWORK APPARATUS q | SERVICE | b.b.b.b |
| ... | ... | ... |
| INFRASTRUCTURE NETWORK APPARATUS r | INFRASTRUCTURE | c.c.c.c |
| INFRASTRUCTURE NETWORK APPARATUS s | INFRASTRUCTURE | d.d.d.d |
| ... | ... | ... |

*FIG. 7*

603  PHYSICAL NETWORK APPARATUS-RESOURCE MAPPING TABLE

| PHYSICAL NETWORK APPARATUS ID (1020) | PHYSICAL PORT ID (1021) | RESOURCE ID (1022) |
|---|---|---|
| . . . | . . . | . . . |
| SERVICE NETWORK APPARATUS p | PHYSICAL PORT p-1 | RESOURCE m-1 |
| SERVICE NETWORK APPARATUS p | PHYSICAL PORT p-2 | RESOURCE m-2 |
| . . . | . . . | . . . |
| SERVICE NETWORK APPARATUS q | PHYSICAL PORT q-1 | RESOURCE n-1 |
| SERVICE NETWORK APPARATUS q | PHYSICAL PORT q-2 | RESOURCE n-2 |
| . . . | . . . | . . . |
| INFRASTRUCTURE NETWORK APPARATUS r | PHYSICAL PORT r-1 | RESOURCE m-1 |
| INFRASTRUCTURE NETWORK APPARATUS r | PHYSICAL PORT r-2 | RESOURCE m-2 |
| . . . | . . . | . . . |
| INFRASTRUCTURE NETWORK APPARATUS s | PHYSICAL PORT s-1 | RESOURCE n-1 |
| INFRASTRUCTURE NETWORK APPARATUS s | PHYSICAL PORT s-2 | RESOURCE n-2 |
| . . . | . . . | . . . |

*FIG. 8*

604  LOGICAL NETWORK APPARATUS MANAGEMENT TABLE

| RESOURCE USER ID (1030) | LOGICAL NETWORK APPARATUS ID (1031) | TYPE (1032) | MANAGEMENT ADDRESS (1033) |
|---|---|---|---|
| USER A | LOGICAL SERVICE NETWORK APPARATUS w | SERVICE | e.e.e.e |
| USER A | LOGICAL INFRASTRUCTURE NETWORK APPARATUS x | INFRASTRUCTURE | f.f.f.f |
| . . . | . . . | . . . | . . . |
| USER B | LOGICAL SERVICE NETWORK APPARATUS y | SERVICE | g.g.g.g |
| USER B | LOGICAL INFRASTRUCTURE NETWORK APPARATUS z | INFRASTRUCTURE | h.h.h.h |
| . . . | . . . | . . . | . . . |

*FIG. 9*

605 LOGICAL NETWORK APPARATUS-PHYSICAL NETWORK APPARATUS MAPPING TABLE

| 1040<br>LOGICAL NETWORK APPARATUS ID | 1041<br>LOGICAL PORT ID | 1042<br>PHYSICAL NETWORK APPARATUS ID | 1043<br>PHYSICAL PORT ID |
|---|---|---|---|
| . . . | . . . | . . . | . . . |
| LOGICAL SERVICE NETWORK APPARATUS w | LOGICAL PORT w-1 | SERVICE NETWORK APPARATUS p | PHYSICAL PORT p-1 |
| LOGICAL SERVICE NETWORK APPARATUS w | LOGICAL PORT w-2 | SERVICE NETWORK APPARATUS q | PHYSICAL PORT q-2 |
| . . . | . . . | . . . | . . . |
| LOGICAL INFRASTRUCTURE NETWORK APPARATUS x | LOGICAL PORT x-1 | INFRASTRUCTURE NETWORK APPARATUS r | PHYSICAL PORT r-1 |
| LOGICAL INFRASTRUCTURE NETWORK APPARATUS x | LOGICAL PORT x-2 | INFRASTRUCTURE NETWORK APPARATUS s | PHYSICAL PORT s-2 |
| . . . | . . . | . . . | . . . |
| LOGICAL SERVICE NETWORK APPARATUS y | LOGICAL PORT y-1 | SERVICE NETWORK APPARATUS p | PHYSICAL PORT p-2 |
| LOGICAL SERVICE NETWORK APPARATUS y | LOGICAL PORT y-2 | SERVICE NETWORK APPARATUS q | PHYSICAL PORT q-1 |
| . . . | . . . | . . . | . . . |
| LOGICAL INFRASTRUCTURE NETWORK APPARATUS z | LOGICAL PORT z-1 | INFRASTRUCTURE NETWORK APPARATUS r | PHYSICAL PORT r-2 |
| LOGICAL INFRASTRUCTURE NETWORK APPARATUS z | LOGICAL PORT z-2 | INFRASTRUCTURE NETWORK APPARATUS s | PHYSICAL PORT s-1 |
| . . . | . . . | . . . | . . . |

FIG. 10

606 VIRTUAL NETWORK MANAGEMENT TABLE

| NETWORK TYPE | VIRTUAL NETWORK ID | RESOURCE USER ID | RESOURCE USER VIRTUAL NETWORK ID | RESOURCE USER VLAN |
|---|---|---|---|---|
| ... | ... | ... | ... | ... |
| SERVICE NETWORK | 1000 | USER A | 1000 | 10 |
| SERVICE NETWORK | 1001 | USER A | 1001 | 11 |
| ... | ... | ... | ... | ... |
| SERVICE NETWORK | 2000 | USER B | 1000 | 10 |
| ... | ... | ... | ... | ... |
| INFRASTRUCTURE NETWORK | 1500 | USER A | 1500 | 1 |
| INFRASTRUCTURE NETWORK | 1501 | USER A | 1501 | 100, 150 |
| ... | ... | ... | ... | ... |
| INFRASTRUCTURE NETWORK | 2500 | USER B | 1500 | 1, 100, 200 |
| ... | ... | ... | ... | ... |

*FIG. 11*

607 VLAN MANAGEMENT TABLE

| NETWORK TYPE | VLAN FOR VIRTUAL NETWORK | RESOURCE USER ID | RESOURCE USER VLAN FOR VIRTUAL NETWORK | VIRTUAL NETWORK ID |
|---|---|---|---|---|
| . . . | . . . | . . . | . . . | . . . |
| SERVICE NETWORK | 1 | USER A | 1 | 1000, 1001 |
| SERVICE NETWORK | 2 | USER B | 1 | 2000 |
| . . . | . . . | . . . | . . . | . . . |
| INFRASTRUCTURE NETWORK | 1 | USER A | 1 | 1500, 1501 |
| INFRASTRUCTURE NETWORK | 2 | USER B | 1 | 2500 |
| . . . | . . . | . . . | . . . | . . . |

FIG. 12

608 LOGICAL NETWORK APPARATUS CONFIGURATION TABLE

| 1070 LOGICAL NETWORK APPARATUS ID | 1071 LOGICAL PORT ID | 1072 VIRTUALIZATION FUNCTION | 1073 VIRTUAL NETWORK ID | 1074 VLAN FOR VIRTUAL NETWORK | 1075 RESOURCE USER VLAN |
|---|---|---|---|---|---|
| ... | ... | ... | ... | ... | ... |
| LOGICAL SERVICE NETWORK APPARATUS w | LOGICAL PORT w-1 | OFF | 1000 | 1 | 10 |
| LOGICAL SERVICE NETWORK APPARATUS w | LOGICAL PORT w-1 | OFF | 1001 | 1 | 11 |
| LOGICAL SERVICE NETWORK APPARATUS w | LOGICAL PORT w-2 | ON | 1000 | 1 | 10 |
| ... | ... | ... | ... | ... | ... |
| LOGICAL INFRASTRUCTURE NETWORK APPARATUS x | LOGICAL PORT x-1 | OFF | - | - | 1, 100, 150 |
| LOGICAL INFRASTRUCTURE NETWORK APPARATUS x | LOGICAL PORT x-2 | OFF | - | - | 1, 100, 150 |
| ... | ... | ... | ... | ... | ... |
| LOGICAL SERVICE NETWORK APPARATUS y | LOGICAL PORT y-1 | OFF | 2000 | 2 | 10 |
| LOGICAL SERVICE NETWORK APPARATUS y | LOGICAL PORT y-2 | OFF | 2000 | 2 | 10 |
| ... | ... | ... | ... | ... | ... |
| LOGICAL INFRASTRUCTURE NETWORK APPARATUS z | LOGICAL PORT z-1 | OFF | - | - | 1, 100, 200 |
| LOGICAL INFRASTRUCTURE NETWORK APPARATUS z | LOGICAL PORT z-2 | OFF | - | - | 1, 100, 200 |
| ... | ... | ... | ... | ... | ... |

FIG. 13

609 PHYSICAL NETWORK APPARATUS CONFIGURATION TABLE

| PHYSICAL NETWORK APPARATUS ID | PHYSICAL PORT ID | VIRTUALIZATION FUNCTION | RESOURCE USER VIRTUAL NETWORK ID | VIRTUAL NETWORK ID | RESOURCE USER VIRTUAL NETWORK-USE VLAN | VLAN FOR VIRTUAL NETWORK | RESOURCE USER VLAN |
|---|---|---|---|---|---|---|---|
| ... | ... | ... | ... | ... | ... | ... | ... |
| SERVICE NETWORK APPARATUS p | PHYSICAL PORT p-1 | OFF | 1000 | 1000 | 1 | 1 | 10 |
| SERVICE NETWORK APPARATUS p | PHYSICAL PORT p-1 | OFF | 1001 | 1001 | 1 | 1 | 11 |
| SERVICE NETWORK APPARATUS p | PHYSICAL PORT p-2 | OFF | 1000 | 2000 | 1 | 2 | 10 |
| ... | ... | ... | ... | ... | ... | ... | ... |
| INFRASTRUCTURE NETWORK APPARATUS r | PHYSICAL PORT r-1 | ON | 1500 | 1500 | 1 | 1 | 1 |
| INFRASTRUCTURE NETWORK APPARATUS r | PHYSICAL PORT r-1 | ON | 1501 | 1501 | 1 | 1 | 100, 150 |
| INFRASTRUCTURE NETWORK APPARATUS r | PHYSICAL PORT r-2 | ON | 1500 | 2500 | 1 | 2 | 1, 100, 200 |
| ... | ... | ... | ... | ... | ... | ... | ... |
| SERVICE NETWORK APPARATUS q | PHYSICAL PORT q-1 | OFF | 1000 | 2000 | 1 | 2 | 10 |
| SERVICE NETWORK APPARATUS q | PHYSICAL PORT q-2 | ON | 1000 | 1000 | 1 | 1 | 10 |
| ... | ... | ... | ... | ... | ... | ... | ... |
| INFRASTRUCTURE NETWORK APPARATUS s | PHYSICAL PORT s-1 | ON | 1500 | 2500 | 1 | 2 | 1, 100, 200 |
| INFRASTRUCTURE NETWORK APPARATUS s | PHYSICAL PORT s-2 | ON | 1500 | 1500 | 1 | 1 | 1 |
| INFRASTRUCTURE NETWORK APPARATUS s | PHYSICAL PORT s-2 | ON | 1501 | 1501 | 1 | 1 | 100, 150 |
| ... | ... | ... | ... | ... | ... | ... | ... |

FIG. 14

610 RESOURCE UTILIZATION STATE REFERENCE MANAGEMENT TABLE

| RESOURCE USER ID 1090 | RESOURCE TYPE 1091 | UTILIZATION REFERENCE 1092 |
|---|---|---|
| . . . | . . . | . . . |
| USER A | HOST COMPUTER | ISSUE RESOURCE SHORTAGE ALERT WHEN ACTUALLY USED RESOURCE COUNT EXCEEDS 2/3 OF ALLOCATED RESOURCE COUNT. ISSUE RESOURCE EXCESS ALERT WHEN ACTUALLY USED RESOURCE COUNT IS LESS THAN 1/2 OF ALLOCATED RESOURCE COUNT. |
| . . . | . . . | . . . |
| USER A | STORAGE | ISSUE RESOURCE SHORTAGE ALERT WHEN UTILIZATION OF VOLUME IN RESOURCE EXCEEDS 2/3. ISSUE RESOURCE EXCESS ALERT WHEN UTILIZATION OF VOLUME IN RESOURCE IS LESS THAN 1/2. |
| . . . | . . . | . . . |
| USER B | HOST COMPUTER | ISSUE RESOURCE SHORTAGE ALERT WHEN AVERAGE CPU UTILIZATION RATIO OF ALLOCATED RESOURCE EXCEEDS 70%. ISSUE RESOURCE EXCESS ALERT WHEN AVERAGE CPU UTILIZATION RATIO OF ALLOCATED RESOURCE IS LESS THAN 40%. |
| . . . | . . . | . . . |
| USER B | STORAGE | ISSUE RESOURCE SHORTAGE ALERT WHEN UTILIZATION OF VOLUME IN RESOURCE EXCEEDS 3/4. ISSUE RESOURCE EXCESS ALERT WHEN UTILIZATION OF VOLUME IN RESOURCE IS LESS THAN 1/2. |
| . . . | . . . | . . . |

*FIG. 15*

| RESOURCE LIST | | |
|---|---|---|
| RESOURCE ID | RESOURCE TYPE | RESOURCE USER |
| RESOURCE m-1 | HOST COMPUTER | USER A |
| RESOURCE m-2 | HOST COMPUTER | USER B |
| ... | ... | ... |
| RESOURCE n-1 | HOST COMPUTER | USER B |
| RESOURCE n-2 | HOST COMPUTER | USER A |
| ... | ... | ... |

DATA CENTER RESOURCE ALLOCATION SYSTEM AND DATA CENTER RESOURCE ALLOCATION METHOD

CLAIM OF PRIORITY

The present application claims priority from Japanese patent application JP 2014-31435 filed on Feb. 21, 2014, the content of which is hereby incorporated by reference into this application.

BACKGROUND

The subject matter disclosed relates to a technology for flexibly combining computer resources among data centers in which a plurality of computer resources (e.g., host computers, storage, and appliances such as firewalls) are coupled via a plurality of network apparatus.

In recent years, the demand for the data center has been growing as more and more individuals, companies, or organizations use cloud services to utilize computers or computer resources for application software flexibly and inexpensively.

In such a data center, many computer resources such as host computers, storage, and appliances (firewalls, load balancers, management apparatus, and the like) are coupled via a network. In some cases, two or more data centers provide their combined computer resources for cloud services and various other uses.

A cloud service and a data center are not always run by the same organization, and a cloud business and a data center business may be different organizations. In that case, a data center is used by a plurality of cloud businesses, each of which in turn provides a service to cloud users (for example, tenants).

A one of challenges in data centers is to provide computer resources quickly and inexpensively by resolving the excess/shortage of computer resources and thus improving the utilization of computer resources. Data centers, which provide computer resources for various uses, also need to separate computer resources for different uses. Providing computer resources inexpensively further requires a reduction in man-hours spent on operation and management.

Various methods have been devised to deal with the challenges in data centers described above, such as improving the computer resource utilization, separating computer resources, and reducing the operation management man-hours.

A common method of improving the computer resource utilization is host computer aggregation using a server virtualization technology. For example, a server virtualization method is described in U.S. Pat. No. 6,075,938 A (Abstract of the Disclosure and other sections).

Network separation by network virtualization is used as a method of separating computer resources. For example, a network virtualization method is described in US 2013/0058215 (Abstract of the Disclosure and other sections).

Operation and management automation by cloud management software is advancing as a method of reducing operation management man-hours. This involves unified management of a plurality of resources in a way optimized for a cloud service. For example, a cloud management method and software are described in "vCloud Director" published by VMware Inc.

SUMMARY

A problem is that, with any one of the methods disclosed in U.S. Pat. No. 6,075,938 A, US 2013/0058215, and "vCloud Director" published by VMware Inc., or even with all of the disclosed methods combined, it is difficult to provide computer resources for various uses quickly, flexibly, and inexpensively.

Specifically, the server virtualization method disclosed in U.S. Pat. No. 6,075,938 A, for example, cannot be used when server performance requirement is critical.

The network virtualization method disclosed in US 2013/0058215 can be used to logically separate a network for providing cloud services to cloud users (a service network), thereby accomplishing flexible provisioning and operation of networks. However, a network for managing and monitoring resources (an infrastructure network) can not be virtualized using the existing network virtualization technologies, thus the flexibility of cloud service infrastructure itself or application system infrastructures itself is not improved and unsolved.

With the cloud management method disclosed in "vCloud Director" published by VMware Inc., computer resources are turned into silos (sectionalized) inside a data center. The resultant problem is that the overall computer resource utilization in a single data center or a plurality of data centers drops, which means that the man-hours required for operation and management cannot be reduced.

For the reasons described above, data centers that have hitherto been known are not capable of providing computer resources for various uses including cloud service and business application quickly, flexibly, and inexpensively.

A representative aspect of the present disclosure is as follows. A system for allocating resources of a data center, the data center comprising: a data center infrastructure comprising at least one service network accessed by a terminal of a logical infrastructure user and a terminal of a resource user, at least one infrastructure network accessed by the terminal of the resource user, and at least one resource coupled to the at least one service network and the at least one infrastructure network; and a resource management apparatus for managing the at least one infrastructure network, the at least one service network, and the at least one resource, the resource management apparatus being configured to: generate, in response to a request from the terminal of the resource user, a logical service network, which is created by virtualizing the service network, a logical infrastructure network, which is created by virtualizing the infrastructure network, and a logical infrastructure in which the at least one resource is allocated to the logical service network and the logical infrastructure network; and provide the logical infrastructure to the terminal of the logical infrastructure user.

According to the teaching herein, combined resources of a plurality of data centers can be accordingly provided for various uses (cloud service, business application, etc.) quickly, flexibly, and inexpensively.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 shows an example of the resource management table according to the first embodiment.

FIG. 7 shows an example of the physical network apparatus management table according to the first embodiment.

FIG. 8 shows an example of the physical network apparatus-resource mapping table according to the first embodiment.

FIG. 9 shows an example of the logical network apparatus management table according to the first embodiment.

FIG. 10 shows an example of the logical network apparatus-physical network apparatus mapping table according to the first embodiment.

FIG. 11 shows an example of the virtual network management table according to the first embodiment.

FIG. 12 shows an example of the VLAN management table according to the first embodiment.

FIG. 13 shows an example of the logical network apparatus configuration table according to the first embodiment.

FIG. 14 shows an example of the physical network apparatus configuration table according to the first embodiment.

FIG. 15 shows an example of the resource utilization state reference management table according to the first embodiment.

DETAILED DESCRIPTION OF THE EMBODIMENTS

Embodiments are described below with reference to the accompanying drawings.

First Embodiment

Figure 1:
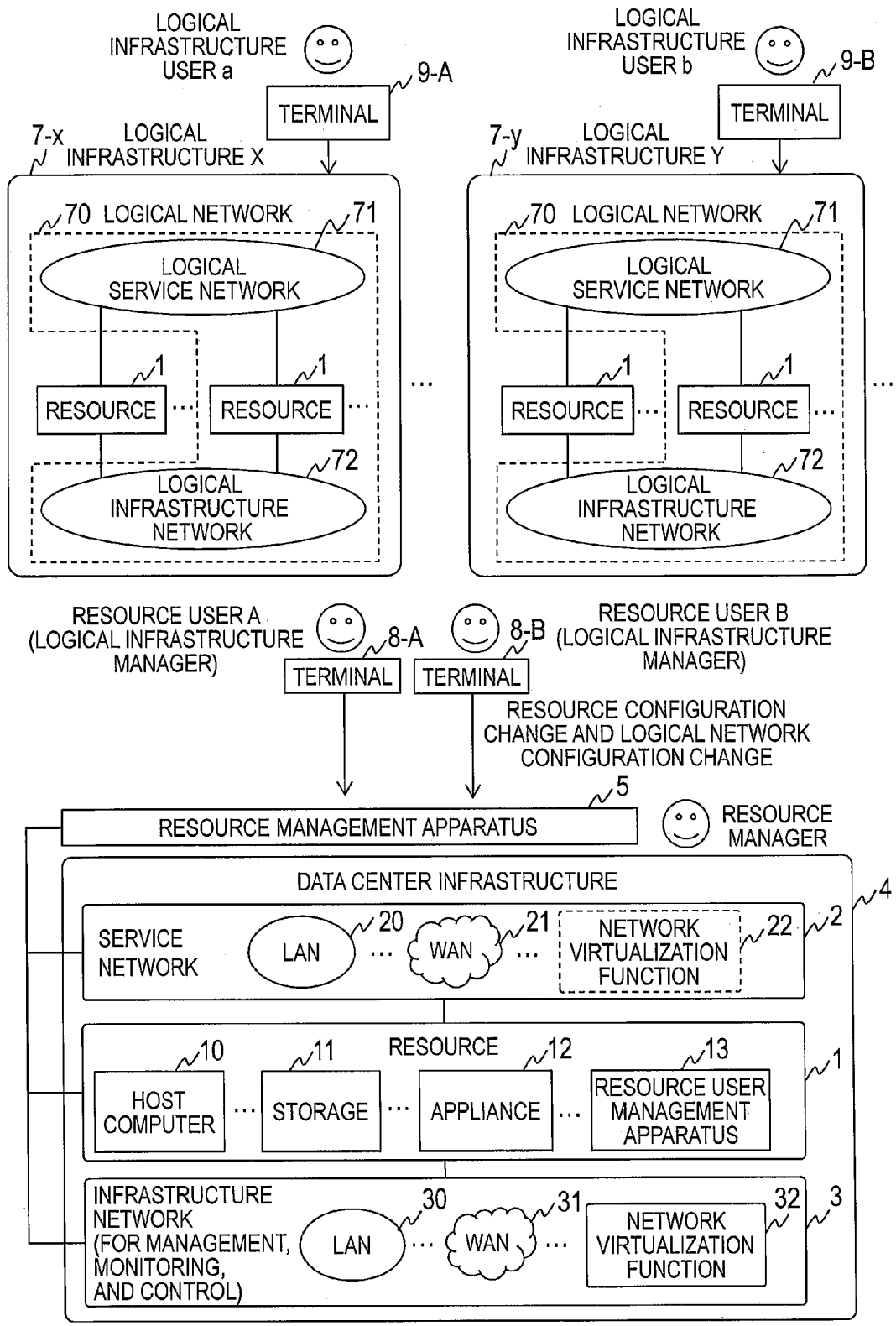
FIG. 1 is a block diagram illustrating an outline of a data center resource allocation system according to a first embodiment.

FIG. 1 is a block diagram illustrating an outline of a data center resource allocation system according to a first embodiment.

The data center resource allocation system is a computer system that includes a data center infrastructure 4 and a resource management apparatus 5. The data center infrastructure 4 includes at least one resource (computer resource) 1, which is coupled to at least one service network 2 and at least one infrastructure network 3. The resource management apparatus 5 manages and controls the service network 2 and the infrastructure network 3 in a centralized manner.

A resource manager operates the resource management apparatus 5 to manage the resource 1, the service network 2, and the infrastructure network 3.

Resource users (logical infrastructure managers) A and B are allocated the resource 1 via the resource management apparatus 5, which is coupled to terminals 8-A and 8-B, and use the allocated resource 1 to build and run logical infrastructures 7-x and 7-y, respectively.

Logical infrastructure users a and b use computer resources that are provided as the logical infrastructures 7-x and 7-y via terminals 9-A and 9-B. The logical infrastructure 7-x is generated by the resource user A and provided to the logical infrastructure user a. Similarly, the logical infrastructure 7-y is generated by the resource user B and provided to the logical infrastructure user b.

The resource users A and B request the resource manager who manages the data center infrastructure 4 to allocate computer resources. The resource manager operates the resource management apparatus 5 to allocate logical computer resources to the terminal 8-A of the resource user A and the terminal 8-B of the resource user B. The resource users A and B respectively generate the logical infrastructures X (7-x) and Y (7-y) from the allocated logical computer resources and provide the generated logical infrastructures to the terminal 9-A of the logical infrastructure user A and the terminal 9-B of the logical infrastructure user B.

The following description uses "terminals 8" when the terminals 8-A and 8-B are mentioned collectively, "logical infrastructures 7" when the logical infrastructures 7-x and 7-y are mentioned collectively, and similarly uses "terminals 9" when the terminal 9-A and 9-B are mentioned collectively. The same rule on suffixes in reference symbols and collective terms also applies to other components.

The resource 1 includes a host computer 10, storage 11, an appliance 12, and a resource user management apparatus 13. The constituents of the resource 1 can be physical apparatus or virtual apparatus.

The appliance 12 is an apparatus including, for example, a firewall, a load balancer, or an intrusion detecting apparatus. The appliance 12 can be provided as a function of a network. In this case, the appliance 12 can be provided as a function of logical networks 70 which construct the logical infrastructures 7 as indicated by the resource 1 that is enclosed by the broken line in each of the logical networks 70.

The resource user management apparatus 13 is, for example, a server management apparatus, a virtual server management apparatus, a storage management apparatus, a network management apparatus, a Dynamic Host Configuration Protocol (DHCP) server, or a Domain Name System (DNS) server.

The resource users A and B who use the terminals 8 are, for example, cloud managers or business application system administrators, and use the resource 1 to build and run the logical infrastructures 7 as cloud service infrastructures or business application system infrastructures.

The logical infrastructure users a and b who use the terminals 9 are, for example, cloud (data center) users, tenant managers, or business application system users.

The logical infrastructure users a and b who use the terminals 9 use, or build and run, virtualized tenant systems (cloud services), or use business application system infrastructures on the logical infrastructures (cloud service infrastructures, business application system infrastructures, or the like) 7 built by the resource users A and B via the terminals 8.

The service network 2 is a network over which the terminals 9 of the logical infrastructure users a and b and the terminals 8 of the resource users A and B hold communication to and from the resource 1, and includes, for example, a local area network (LAN) 20 and a wide area network (WAN) 21. The LAN 20 and the WAN 21 may cover a plurality of data centers. The service network 2 in some cases has a network virtualization function 22.

The infrastructure network 3 is a network that couples the resource 1 and the resource management apparatus 5 to hold communication for the management, monitoring, control, or the like of computer resources of the logical infrastructures 7 or the data center infrastructure 4. The infrastructure network 3 includes, for example, a LAN 30 and a WAN 31. The LAN 30 and the WAN 31 may cover a plurality of data centers. The infrastructure network 3 has a network virtualization function 32.

Each logical infrastructure 7 includes at least one resource 1. The resource 1 is coupled to a logical service network 71, which is an abstracted service network, and a logical infrastructure network 72, which is an abstracted infrastructure network. When there are a plurality of logical infrastructures 7, one logical infrastructure 7 is logically separated from another logical infrastructure 7.

The logical infrastructure 7 can include some constituents of the resource 1 (for example, host computer 10, the storage 11, the appliance 12, and the resource user management apparatus 13), the logical service network 71, and the logical infrastructure network 72. The logical service network 71 and the logical infrastructure network 72 construct one logical network 70.

The logical networks 70 are a concept for packaging into one service the logical service network 71 and the logical infrastructure network 72 to which the resource 1 is coupled, host computer 10, the storage 11 and the appliance 12, which are used by the resource users A and B, and the resource user management apparatus 13, when the resource manager operates the resource management apparatus 5 to provide the resource 1 of the data center infrastructure 4 to the resource users A and B. The data center infrastructure 4 is a concept in which at least one data center is included.

Figure 2:
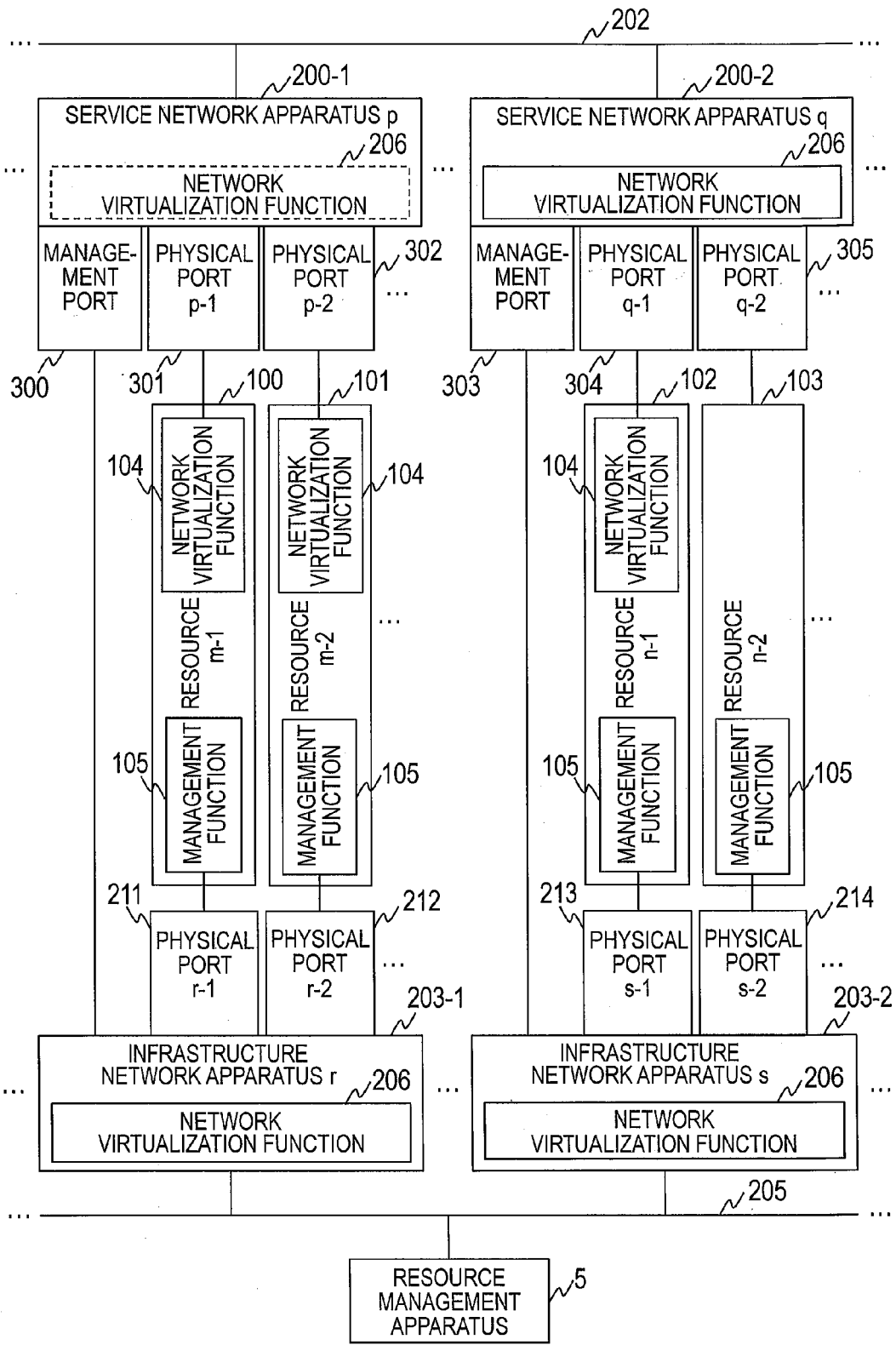
FIG. 2 illustrates an example of the overall configuration of the data center resource allocation system according to the first embodiment.

FIG. 2 illustrates an example of the overall configuration of the data center resource allocation system.

In this embodiment, at least one resource 1 (a resource m-1 (100), a resource m-2 (101), a resource n-1 (102), and a resource n-2 (103) in the illustrated example) is coupled to at least one service network apparatus (here, a service network apparatus p (200-1) and a service network apparatus q (200-2)) which constructs the service network 2 and at least one infrastructure network apparatus (here, an infrastructure network apparatus r (203-1) and an infrastructure network apparatus s (203-2)) which constructs the infrastructure network 3.

In the service network apparatus p (200-1), for example, the resource m-1 (100) is coupled to a physical port p-1 (301), the resource m-2 (101) is coupled to a physical port p-2 (302), and a management port 300 is coupled to the infrastructure network apparatus r (203-1). The infrastructure network apparatus r (203-1) has a physical port r-1 (211) to which the resource m-1 (100) is coupled, and a physical port r-2 (212) to which the resource m-2 (101) is coupled.

In the service network apparatus q (200-2), the resource n-1 (102) is coupled to a physical port q-1 (304), the resource n-2 (103) is coupled to a physical port q-2 (305), and a management port 303 is coupled to the infrastructure network apparatus s (203-2). The infrastructure network apparatus s (203-2) has a physical port s-1 (213) to which the resource n-1 (102) is coupled, and a physical port s-2 (214) to which the resource n-2 (103) is coupled.

The resource 1 may have a network virtualization function 104. For instance, when the resource 1 is a host computer and hypervisor software which virtualizes a server is introduced into the resource 1, the hypervisor software, or virtual switch software running on the hypervisor software, can function as the network virtualization function 104.

In the case where the resource 1 has the network virtualization function 104, communication over the service network 2 can be virtualized by the network virtualization function 104.

The network virtualization function 104 is a method of logically separating communication by encapsulating communication packets, attaching tags to communication packets, assigning identifiers, or the like. This is accomplished by publicly-known or well-known technologies, for example, overlay network virtualization such as Virtual Local Area Network (VLAN), Virtual Extensible Local Area Network (VXLAN), Generic Routing Encapsulation (GRE), Network Virtualization using GRE (NVGRE), and Stateless Transport Tunneling (STT), and hop-by-hop virtualization such as slicing. Examples of the publicly-known or well-known technologies also include Provider Backbone Bridge (PBB), Multiprotocol Label Switching (MPLS), Q-in-Q, and MAC-in-MAC (MAC stands for Media Access Control).

The resource 1 also has a management function 105 which enables the terminals 8 of the resource users A and B to manage and monitor the resource 1.

For example, when the resource 1 is a host computer and hypervisor software which virtualizes a server is introduced into the resource 1, a function for managing and monitoring the hypervisor software and an interface thereof correspond to the management function 105 in FIG. 2.

The management function 105 of the resource 1 is coupled to the infrastructure network apparatus 203 without the intervention of the network virtualization function 104.

The service network apparatus 200 and the infrastructure network 203 are each a piece of equipment that executes communication processing, for example, a switch, a router, or other similar types of equipment.

The service network apparatus 200 and the infrastructure network apparatus 203 are hereinafter referred to as physical network apparatus when there is no particular need to distinguish one from the other.

The service network apparatus 200-1 and 200-2 are coupled to each other via a network 202. The terminals 8 and 9 of FIG. 1 are also coupled to the network 202. The infrastructure network apparatus 203-1 and 203-2 are coupled to each other via a network 205.

The networks 202 and 205 can be implemented by wired networks such as a public network, the Internet, a dedicated line, and a LAN, by wireless networks that use a wireless LAN, mobile communication base stations, a communication satellite, and the like, or by other networks.

Some of the service network apparatus 200 (here, the service network apparatus q (200-2)) and all of the infrastructure network apparatus 203 have a network virtualization function 206.

The network virtualization function 206 of the infrastructure network apparatus 203 logically separates communication in the same manner as in the network virtualization function 104 by encapsulating communication packets, attaching tags to communication packets, assigning identifiers, or the like.

In this embodiment, the network virtualization function 206 of the service network apparatus 200 may virtualize communication of the service network 2 only when the resource 1 does not have the network virtualization function 104, or when the network virtualization function 104 of the resource 1 does not virtualize communication of the service network 2.

Alternatively, the network virtualization function 206 of the service network apparatus 200 may virtualize communication of the service network 2 irrespective of whether or not the resource 1 has the network virtualization function 104, or whether or not the network virtualization function 104 of the resource 1 virtualizes communication of the service network 2.

The following description of this embodiment deals with the case where the network virtualization function 206 of the service network apparatus 200 virtualizes communication of the service network 2 only when the resource 1 does not have the network virtualization function 104, or when the network virtualization function 104 of the resource 1 does not virtualize communication of the service network 2.

In this embodiment, communication over the infrastructure network 3 that is related to the management function 105 of the resource 1 is virtualized by the network virtualization functions 206 of the infrastructure network apparatus 203.

The service network apparatus 200, the infrastructure network apparatus 203, and the resource 1 are coupled directly or indirectly to the resource management apparatus 5.

In this embodiment, the service network apparatus 200 are coupled at their respective management ports 300 and 303 to the resource management apparatus 5 via the infrastructure network apparatus 203 and the network 205.

The infrastructure network apparatus 203 are coupled to the resource management apparatus 5 via the network 205, and the resource 1 is coupled to the resource management apparatus 5 via physical ports, the infrastructure network apparatus 203, and the network 205, which enables the resource management apparatus 5 to manage and control those apparatus in a centralized manner.

In FIG. 2, the service network apparatus 200-1, the resource m-1 (100), the resource m-2 (101), and the infrastructure network apparatus 203-1 may belong to a first data center, whereas the service network apparatus 200-2, the resource n-1 (102), the resource n-2 (103), and the infrastructure network apparatus 203-2 belong to a second data center. In this case, the resource management apparatus 5 manages and controls resources of the first data center and the second data center in a centralized manner. Then the data center infrastructure 4 is made up of a plurality of data centers.

Figure 3:
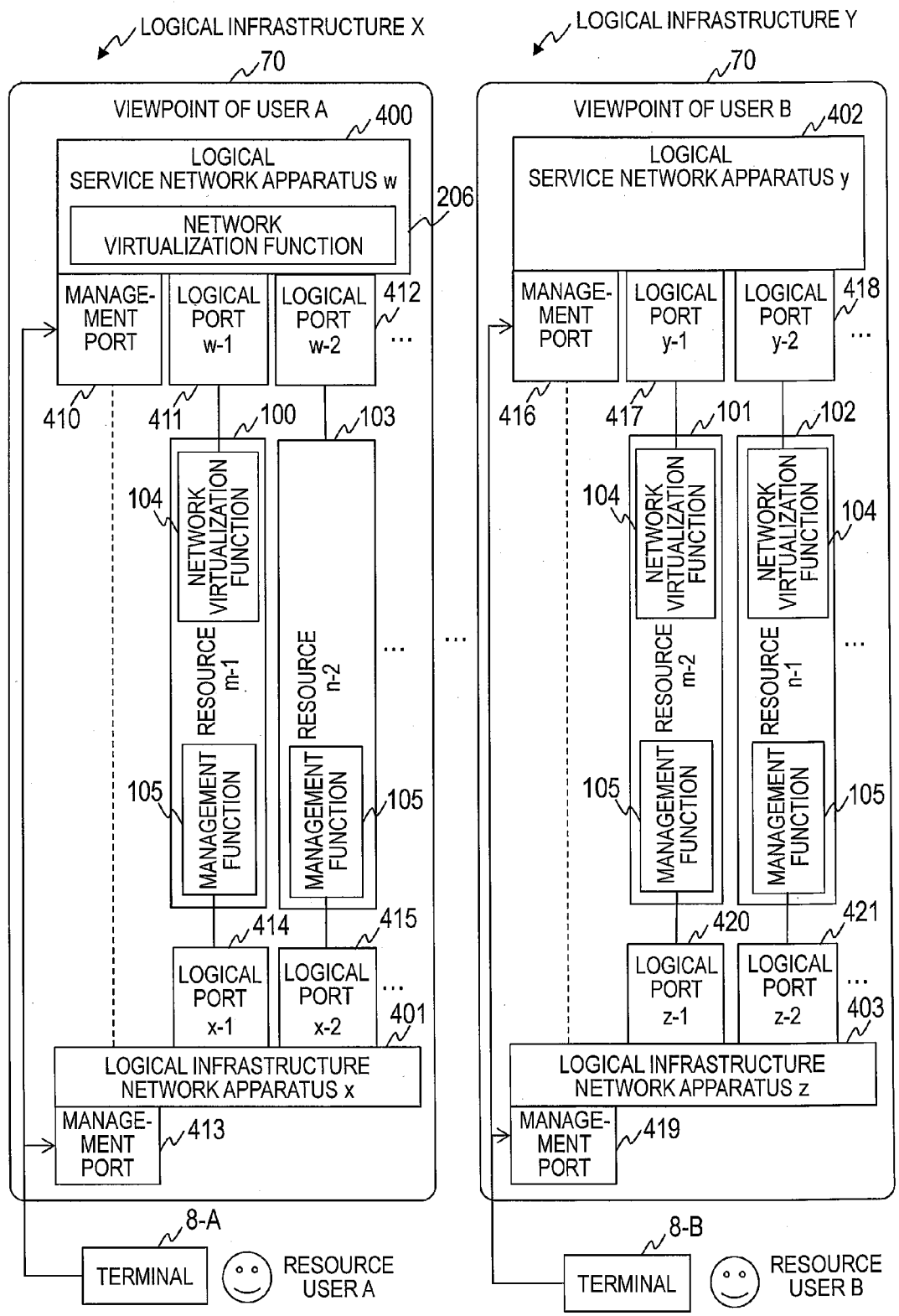
FIG. 3 is a block diagram illustrating an example of the logical configuration of the data center resource allocation system that is viewed from resource users according to the first embodiment.

FIG. 3 is a block diagram illustrating an example of the logical configuration of the data center resource allocation system that is viewed from resource users. The configuration viewed from resource users is a computer system configuration that allows the terminal 8-A operated by the resource user A and the terminal 8-B operated by the resource user B to access the data center infrastructure 4. The resource users A and B are allocated logical computer resources by the resource manager who manages the data center infrastructure 4, and respectively generate the logical infrastructure X and logical infrastructure Y of FIG. 1 to provide the logical infrastructures to the terminals 9 of the logical infrastructure users a and b.

The resource management apparatus 5 allocates at least one resource 1 to the terminal 8-A operated by the resource user A and the terminal 8-B operated by the resource user B. In the example of FIG. 3, the resource m-1 (100) and the resource n-2 (103) are allocated to the resource user A, and the resource m-2 (101) and the resource n-1 (102) are allocated to the resource user B.

Those resources 1, logical service network apparatus 400 and 402, and logical infrastructure network apparatus 401 and 403 construct the logical infrastructure X (7-x) and the logical infrastructure Y (7-y).

The logical service network apparatus 400 and 402 are an abstracted (or virtualized) form of the physical service network apparatus 200-1 and 200-2. Similarly, the logical infrastructure network apparatus 401 and 403 are an abstracted (or virtualized) form of the physical infrastructure network apparatus 203-1 and 203-2.

Interfaces to the logical service network apparatus 400 and 402 and the logical infrastructure network apparatus 401 and 403 are generated by a logical network apparatus interface function 611 of the resource management apparatus 5 to be provided to the terminals 8 of the resource users A and B. The logical network apparatus interface function 611 uses resources that are allocated to the resource users A and B out of physical resources of the service network apparatus 200 and the infrastructure network apparatus 203 to generate the logical service network apparatus 400 and 402 and the logical infrastructure network apparatus 401 and 403, and provides the generated logical network apparatus to the terminals 8. In short, the logical network apparatus are abstracted (virtualized) functions of a plurality of physical network apparatus or part of physical network apparatus. For instance, the logical infrastructure network apparatus x (401) of FIG. 3 virtualizes the physical ports r-1 and s-2 out of components of the infrastructure network apparatus r (203-1) and the infrastructure network apparatus x (203-2) which are illustrated in FIG. 2, and provides the virtualized ports as logical ports x-1 and x-2 to the terminals 8.

In the example of FIG. 3, the logical service network apparatus w (400) and the logical infrastructure network apparatus x (401) construct the logical networks 70 of the logical infrastructure X (7-x), which is recognized by the terminal 8-A of the resource user A, and the logical service network apparatus y (402) and the logical infrastructure network apparatus z (403) construct the logical networks 70 of the logical infrastructure Y (7-y), which is recognized by the terminal 8-B of the resource user B.

The logical service network apparatus w and y and the logical infrastructure network apparatus x and z are coupled to the components of the resources 1 via logical ports.

The logical service network apparatus w (400) of the logical infrastructure X has a logical management port 410, a logical port w-1 (411), and a logical port w-2 (412). The logical infrastructure network apparatus x (401) has a logical management port 413, a logical port x-1 (414), and a logical port x-2 (415). The resource m-1 (100) is coupled to the logical port w-1 (411) and the logical port x-1 (414). The resource n-2 (103) is coupled to the logical port w-2 (412) and the logical port x-2 (415). The logical management port 410 of the logical service network apparatus w and the logical management port 413 of the logical infrastructure network apparatus x are coupled to the terminal 8-A.

The logical service network apparatus y (402) of the logical infrastructure Y has a logical management port 416, a logical port y-1 (417), and a logical port y-2 (418). The logical infrastructure network apparatus z (403) has a logical management port 419, a logical port z-1 (420), and a logical port z-2 (421). The resource m-2 (101) is coupled to the logical port y-1 (417) and the logical port z-1 (420). The resource n-1 (102) is coupled to the logical port y-2 (418) and the logical port z-2 (421). The logical management port 416 of the logical service network apparatus y and the logical management port 419 of the logical infrastructure network apparatus z are coupled to the terminal 8-B.

The logical service network apparatus 400 and 402 and the logical infrastructure network apparatus 401 and 403 construct the logical networks 70 which are abstracted (or virtualized) networks. The association of the logical service network apparatus 400 and 402 and the logical infrastructure network apparatus 401 and 403 with the service network apparatus 200 and the infrastructure network apparatus 203, which are physical network apparatus, are managed by the resource management apparatus 5.

The resource management apparatus 5 provides, to the individual resource users A and B, management interfaces to the logical service network apparatus 400 and 402 and the logical infrastructure network apparatus 401 and 403, which are interfaces similar to those of the physical service network apparatus 200 and infrastructure network apparatus 203. The resource management apparatus 5 provides a management interface for each logical network apparatus.

On the basis of the association of the logical service network apparatus 400 and 402 and the logical infrastructure network apparatus 401 and 403 with the physical service network apparatus 200 and the infrastructure network apparatus 203, the resource management apparatus 5 controls physical network apparatus so that management operation performed by the individual resource users A and B via the management interfaces are reflected on the service network apparatus 200 and the infrastructure network apparatus 203.

The system configuration is thus made to seem, to the terminals 8 of the individual resource users A and B, as though the resources 1 that are allocated to the individual resource users A and B are coupled to the logical service network apparatus 400 and 402 and the logical infrastructure network apparatus 401 and 403, which are included in the logical infrastructure X of the resource user A and the logical infrastructure Y of the resource user B.

The management interfaces of the logical service network apparatus 400 and 402 and the logical infrastructure network apparatus 401 and 403 can be implemented by command line interfaces (CLIs), graphical user interfaces (GUIs), APIs, or the like, and are provided to the terminals 8 by the logical network apparatus interface function, which is described later.

The management interfaces may be provided in the form of the logical management ports 410, 413, 416, and 419 as in the physical service network apparatus 200 and infrastructure network apparatus 203.

For example, the terminals 8 of the resource users A and B manage the logical service network apparatus w (400), the logical infrastructure network apparatus x (401), the logical service network apparatus y (402), and the logical infrastructure network apparatus z (403) via the logical management ports 410, 413, 416, and 419. The management interfaces can request the resource management apparatus 5 to add resources or return resources.

The logical management ports 410 and 416 may be coupled to the logical infrastructure network apparatus x (401) and the logical infrastructure network apparatus z (403), with the terminals 8 of the resource users A and B managing the logical service network apparatus w (400) and the logical service network apparatus y (402) via the logical management ports 413 and 419.

This invention uses the logical service networks 71 generated by the virtualization of the service network apparatus 200, which are accessed by the terminals 9 of the logical infrastructure users, and the logical infrastructure networks 72 generated by the virtualization of the infrastructure network apparatus 203, which manage the resource 1, so that the resource 1 can be used flexibly.

In the logical infrastructure X of FIG. 3, the logical port x-1 of the logical infrastructure network apparatus 401 corresponds to the physical port r-1 of the infrastructure network apparatus 203-1 of FIG. 2, and the logical port x-2 corresponds to the physical port s-2 of the infrastructure network apparatus 203-2 of FIG. 2. The logical port w-1 of the logical service network apparatus 400 corresponds to the physical port p-1 of the service network apparatus 200-1 of FIG. 2, and the logical port w-2 corresponds to the physical port q-2 of the service network apparatus 200-2 of FIG. 2.

In short, the resource 1 can be incorporated in the logical infrastructure X in this invention regardless of the physical location of the resource 1 by coupling the infrastructure network apparatus 203-1 and 203-2 via a virtual network and coupling the service network apparatus 200-1 and 200-2 via a virtual network.

The logical service network apparatus 402 in FIG. 3 is not equipped with the network virtualization function 206, whereas the logical service network apparatus 400 is equipped with the network virtualization function 206. This is because the lack of the network virtualization function 104 in the resource n-2 of the logical infrastructure X necessitates the network virtualization function 206 in the logical service network apparatus 400. The resources m-2 and n-1 coupled to the logical service network apparatus 402, on the other hand, each have the network virtualization function 104, which makes the network virtualization function 206 unnecessary in the logical service network apparatus 402.

Figure 4:
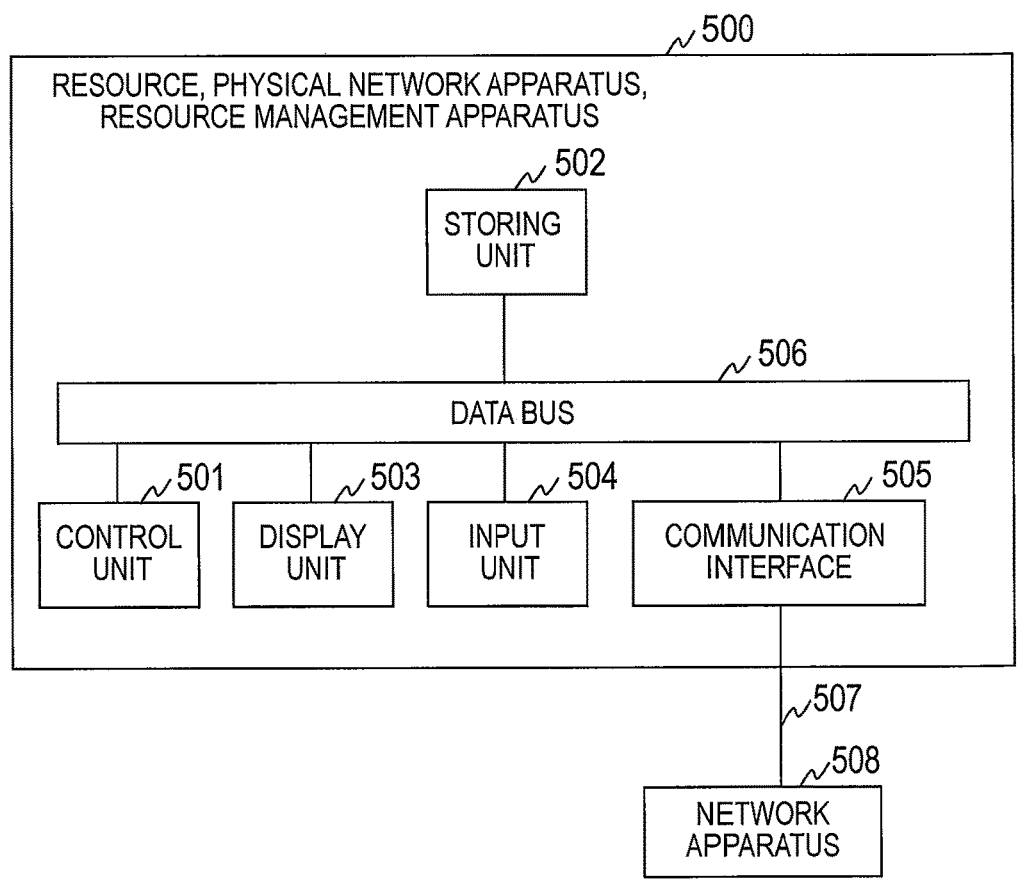
FIG. 4 illustrates an example of the hardware configuration of the resource, a network apparatus and a resource management apparatus according to the first embodiment.

FIG. 4 illustrates an example of the hardware configuration of the resource 1, the physical network apparatus (the service network apparatus 200 and the infrastructure network apparatus 203), and the resource management apparatus 5. In the case where the resource 1 is a virtual apparatus instead of a physical apparatus, FIG. 4 illustrates an example of a logically imitated hardware configuration.

FIG. 4 uses a collective term "apparatus 500" for the resource 1, the physical network apparatus, and the resource management apparatus 5. Each apparatus 500 includes a control unit 501, which includes a central processing unit (CPU) or the like, a storing unit 502, a communication interface 505, which is for coupling to one of the service network apparatus 200 or to one of the infrastructure network apparatus 203 via a communication line 507, a display unit 503, an input unit 504, and a data bus (or interconnect) 506, which couples all those components to one another.

The storing unit 502 can include, for example, a volatile storage device such as a semiconductor memory (e.g., random access memory (RAM)), or a non-volatile storage device capable of read and write such as a hard disk or a solid state drive (SSD), or a read-only non-volatile storage device such as a magneto-optical medium. A program executed on the apparatus 500 may be stored in a non-transitory data storage medium such as a hard disk or an SSD.

In the apparatus 500, computing processing that accompanies the execution of software, for example, is executed by the control unit 501.

The display unit 503 can include a CRT display, a liquid crystal display, or the like. The input unit 504 can include a keyboard and/or a mouse, or the like.

A program executed by the control unit 501 and data used by the program may be stored in the storing unit 502, or may be introduced from another piece of equipment via the communication line 507. The apparatus 500 may have a configuration in which the display unit 503 and the input unit 504 are omitted. The apparatus 500 may be provided with a plurality of communication interfaces 505.

Figure 5:
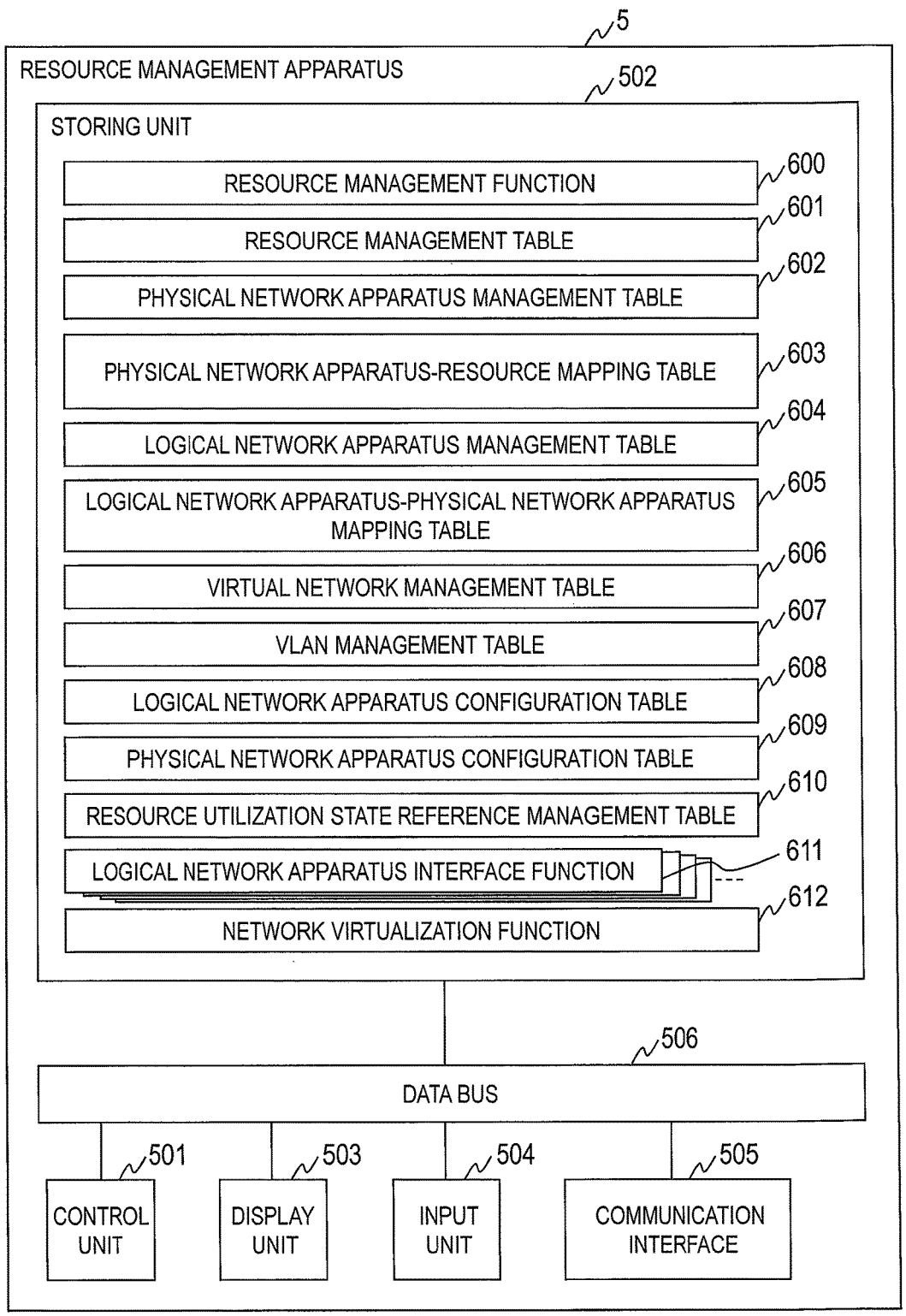
FIG. 5 is a block diagram illustrating an example of the software configuration of the resource management apparatus according to the first embodiment.

FIG. 5 is a block diagram illustrating an example of the software configuration of the resource management apparatus 5.

A resource management function 600 is a program that executes, in response to requests from the terminals 8 operated by the resource users A and B, the allocation of the resource 1, configuration changes of the logical networks 70, configuration changes of the physical network apparatus (the service network apparatus 200 and the infrastructure network apparatus 203), and the like.

A resource management table 601 is a table that stores information about the type of the resource 1 and information about the utilization state of the resource 1.

A physical network apparatus management table 602 is a table that stores information about the service network apparatus 200 and the infrastructure network apparatus 203.

A physical network apparatus-resource mapping table 603 is a table that stores information about coupling relations between the service network apparatus 200 and the resource 1 and between the infrastructure network apparatus 203 and the resource 1.

A logical network apparatus management table 604 is a table that stores information about the logical service network apparatus 400 and 402 and the logical infrastructure network apparatus 401 and 403.

A logical network apparatus-physical network apparatus mapping table 605 is a table that stores information about association between the logical service network apparatus 400 and 402 and the service network apparatus 200, and association relations between the logical infrastructure network apparatus 401 and 403 and the infrastructure network apparatus 203.

A virtual network management table 606 is a table that stores information about the association between a virtual network and a resource user's network to be virtualized.

A VLAN management table 607 is a table that stores information about the association between a virtual network and a VLAN where the virtual network is isolated and transferred.

A logical network apparatus configuration table 608 is a table that stores logical network configuration information which is set in the logical service network apparatus 400 and 402 and the logical infrastructure network apparatus 401 and 403 by the resource users A and B via the terminals 8.

A physical network apparatus configuration table 609 is a table that stores network configuration information which is set, on the basis of the logical network configuration information set in the logical service network apparatus and the logical infrastructure network apparatus, in the corresponding service network apparatus 200 and infrastructure network apparatus 203 by the resource users A and B via the terminals 8.

A resource utilization state reference management table 610 is a table that stores, for each type of the resource 1, reference information for determining the excess or shortage of resources.

The logical network apparatus interface function 611 is a program that behaves as the logical service network apparatus 400 and 402 and the logical infrastructure network apparatus 401 and 403 and provides the management interfaces to the terminals 8 of the resource users A and B.

The logical network apparatus interface function 611 may operate on other apparatus than the resource management apparatus 5, or may be provided as hardware.

A network virtualization function 612 enables the logical network apparatus interface function 611 to couple the terminals 8 to the logical service networks 71, which are created by virtualization for the resource users A and B, respectively, and to the logical infrastructure networks 72, which are created by virtualization for the resource users A and B, respectively.

The resource management function 600, the logical network apparatus interface function 611, and the network virtualization function 612 are loaded as programs onto the storing unit 502. The control unit 501, which includes a CPU, executes processing as programmed by the programs, thereby operating as function modules that provide given functions. For instance, the control unit 501 can provide the resource management function 600 by executing processing as programmed by a resource management program. The same applies to other programs. The control unit 501 also operates as function modules that provide the respective functions of a plurality of processing procedures executed by each of the programs. A computer and a computer system are an apparatus and a system that include those function modules.

The tables 601 to 610 of the storing unit 502 are created or updated at given timing by relevant functions of the resource management apparatus 5.

FIG. 6 shows an example of the resource management table 601. Each entry in the resource management table 601 includes a resource ID 1000, a resource type 1001, and a resource user ID 1002.

The resource ID 1000 is information for uniquely identifying the resource 1 (for example, an identifier). The resource type 1001 is information that indicates the type of the resource 1, such as "host computer", "storage", or "appliance". The resource type 1001 may also differentiate a physical apparatus and a virtual apparatus.

The resource user ID 1002 is information for uniquely identifying the resource user A or B that is allocated the resource 1 (for example, an identifier).

The resource identifier and the resource user identifier can be any value that is unique throughout at least one data center managed by the resource management apparatus 5.

FIG. 7 shows an example of the physical network apparatus management table 602. Each entry in the physical network apparatus management table 602 includes a physical network apparatus ID 1010, a type 1011, and a management address 1012.

The physical network apparatus ID 1010 in an entry for one of the service network apparatus 200 or one of the infrastructure network apparatus 203 is information for uniquely identifying the service network apparatus 200 or the infrastructure network apparatus 203 (for example, an identifier).

The type 1011 is information that indicates the type of the physical network apparatus of the entry, such as "service network apparatus" or "infrastructure network apparatus".

The management address 1012 is network identification information that is allocated to a management interface for the service network apparatus 200 or infrastructure network apparatus 203 of the entry.

FIG. 8 shows an example of the physical network apparatus-resource mapping table 603. Each entry in the physical network apparatus-resource mapping table 603 includes a physical network apparatus ID 1020, a physical port ID 1021, and a resource ID 1022.

The physical network apparatus ID 1020 in an entry for one of the service network apparatus 200 or one of the infrastructure network apparatus 203 is information for uniquely identifying the service network apparatus 200 or the infrastructure network apparatus 203 (for example, an identifier).

The physical port 1021 in an entry for one of the service network apparatus 200 or one of the infrastructure network apparatus 203 is information for uniquely identifying the physical port (for example, an identifier).

The resource ID 1022 is information for uniquely identifying the resource 1 (for example, an identifier).

FIG. 9 shows an example of the logical network apparatus management table 604. Each entry in the logical network apparatus management table 604 includes a resource user ID 1030, a logical network apparatus ID 1031, a type 1032, and a management address 1033.

The resource user ID 1030 is information for uniquely identifying the resource users A and B (for example, an identifier).

The logical network apparatus ID 1031 in an entry for one of the logical service network apparatus 400 and 402 or one of the logical infrastructure network apparatus 401 and 403 is information for uniquely identifying the logical service network apparatus 400 and 402 or the logical infrastructure network apparatus 401 and 403 (for example, an identifier).

The type 1032 is information that indicates the type of the logical network apparatus of the entry, such as "logical service network apparatus" or "logical infrastructure network apparatus".

The management address 1033 is network identification information (for example, a network address) that is allocated to a management interface for the logical service network apparatus 400 and 402 or the logical infrastructure network apparatus 401 and 403 of the entry.

FIG. 10 shows an example of the logical network apparatus-physical network apparatus mapping table 605. Each entry in the logical network apparatus-physical network apparatus mapping table 605 includes a logical network apparatus ID 1040, a logical port ID 1041, a physical network apparatus ID 1042, and a physical port ID 1043.

The logical network apparatus ID 1040 in an entry for one of the logical service network apparatus 400 and 402 or one of the logical infrastructure network apparatus 401 and 403 is information for uniquely identifying the logical network apparatus (for example, an identifier).

The logical port ID 1041 in an entry for one of the logical service network apparatus 400 and 402 or one of the logical infrastructure network apparatus 401 and 403 is information for uniquely identifying the logical ports w-1 to z-2 of the logical network apparatus (for example, an identifier).

The physical network apparatus ID 1042 is information for uniquely identifying one of the service network apparatus 200 or one of the infrastructure network apparatus 203 (for example, an identifier).

The physical port ID 1043 is information for uniquely identifying the physical ports p-1 to s-2 of one of the service network apparatus 200 or one of the infrastructure network apparatus 203 (for example, an identifier).

FIG. 11 shows an example of the virtual network management table 606. Each entry in the virtual network management table 606 includes a network type 1050, a virtual network ID 1051, a resource user ID 1052, a resource user virtual network ID 1053, and a resource user VLAN 1054.

The network type 1050 is information that indicates a network type such as "service network" or "logical network".

The virtual network ID 1051 is information that is used by the resource manager to identify a virtual network uniquely throughout the service network apparatus 200 and the infrastructure network apparatus 203 which are physical network apparatus (for example, an identifier). In the case where the virtual network of the entry is a VXLAN, for instance, the VXLAN Network Identifier (VNI) is used as this information.

The resource user ID 1052 is information for uniquely identifying a resource user (for example, an identifier). The resource user virtual network ID 1053 is virtual network identification information that is recognizable to the resource user on the terminal 8, and is information for identifying the virtual network of the entry uniquely throughout the logical service network apparatus 400 and 402 and the logical infrastructure network apparatus 401 and 403 (for example, an identifier).

The resource user VLAN 1054 is information for uniquely identifying a VLAN that is virtualized by the network virtualization function 104 or the network virtualization function 206 and that is recognizable to the resource user on the terminal 8 (for example, an identifier). Resource user VLANs are used inside logical infrastructures.

The virtual network ID 1051 is virtual network identification information in physical network apparatus, and is associated with the resource user virtual network ID 1053.

VLANs (each identified by a resource user VLAN ID (1054)) that are used by logical infrastructure users and resource users are virtualized by the virtualization function of the resource 1, the logical service network apparatus 400 and 402, or the logical infrastructure network apparatus 401 and 403. From the viewpoint of a resource user of a VLAN (through the relevant terminal 8 and the logical network apparatus interface function 611), the VLAN is virtualized by virtualization in the logical service network apparatus 400 and 402 and the logical infrastructure network apparatus 401 and 403, and a virtual network (identified by a resource user virtual network ID) used in the virtualization and a VLAN (a resource user VLAN for virtual network) in which packet of the virtual network flow are visible. While there may be duplicates for the ID of the virtual network (1053) and the ID of the resource user VLAN for virtual network (1063) among resource users, a virtual network and a VLAN for virtual network are uniquely identified (converted in some cases) (a virtual network ID (1051) and a VLAN for virtual network ID (1061)) from the viewpoint of the resource manager.

FIG. 12 shows an example of the VLAN management table 607. Each entry in the VLAN management table 607 includes a network type 1060, a VLAN for virtual network 1061, a resource user ID 1062, a resource user VLAN for virtual network 1063, and a virtual network ID 1064.

The network type 1060 is information that indicates a network type such as "service network" or "logical network".

The VLAN for virtual network 1061 is information that is used by the resource manager to identify a VLAN used by the virtual network throughout the service network apparatus 200 and the infrastructure network apparatus 203 which are physical network apparatus (for example, an identifier).

The resource user ID 1062 is information for uniquely identifying a resource user who uses resources via the terminal 8 (for example, an identifier).

The resource user VLAN for virtual network 1063 is VLAN for virtual network identification information that is recognizable to the resource user on the terminal 8, and is information for identifying the VLAN for virtual network of the entry uniquely throughout the logical service network apparatus 400 and 402 and the logical infrastructure network apparatus 401 and 403 (for example, an identifier).

The VLAN for virtual network 1061 is VLAN for virtual network identification information in physical network apparatus (the service network apparatus 200 and the infrastructure network apparatus 203), and is associated with the resource user VLAN for virtual network 1063.

The virtual network ID 1064 is associated with the VLAN for virtual network 1061 and serves as information for uniquely identifying a virtual network.

FIG. 13 shows an example of the logical network apparatus configuration table 608. Each entry in the logical network apparatus configuration table 608 includes a logical network apparatus ID 1070, a logical port ID 1071, a virtualization function 1072, a virtual network ID 1073, a VLAN for virtual network 1074, and a resource user VLAN 1075.

The logical network apparatus ID 1070 in an entry for one of the logical service network apparatus 400 and 402 or one of the logical infrastructure network apparatus 401 and 403 is information for uniquely identifying the logical network apparatus (for example, an identifier).

The logical port ID 1071 is information for uniquely identifying one of the logical ports w-1 to z-2 of the logical service network apparatus 400 and 402 and the logical infrastructure network apparatus 401 and 403 (for example, an identifier).

The virtualization function 1072 is information that indicates whether the network virtualization function is enabled or disabled at the logical port of the logical network apparatus of the entry that is identified by the logical port ID 1071. A value "ON" of the virtualization function 1072 indicates that the virtualization function is enabled at the logical port identified by the logical port ID 1071. A value "OFF" of the virtualization function 1072 indicates that the virtualization function is disabled at the logical port identified by the logical port ID 1071.

The virtual network ID 1073 is information for uniquely identifying a virtual network (for example, a virtual network number).

The VLAN for virtual network 1074 is information for uniquely identifying a VLAN that is used by the virtual network of the entry at the logical port identified by the logical port ID 1071 (for example, an identifier).

The resource user VLAN 1075 is information for uniquely identifying a resource user VLAN that is created through virtualization by the virtual network of the entry (for example, a VLAN number).

FIG. 14 shows an example of the physical network apparatus configuration table 609. Each entry in the physical network apparatus configuration table 609 includes a physical network apparatus ID 1080, a physical port ID 1081, a virtualization function 1082, a resource user virtual network ID 1083, a virtual network ID 1084, a resource user VLAN for virtual network 1085, a VLAN for virtual network 1086, and a resource user VLAN 1087.

The physical network apparatus ID 1080 in an entry for one of the service network apparatus 200 or one of the infrastructure network apparatus 203 is information for uniquely identifying the physical network apparatus (for example, an identifier).

The physical port ID 1081 is information for uniquely identifying one of the physical ports of the service network apparatus 200 and the infrastructure network apparatus 203 (for example, an identifier).

The virtualization function 1082 is information that indicates whether the network virtualization function is enabled or disabled at the physical port of the physical network apparatus ID 1080 of the entry that is identified by the physical port ID 1081. A value "ON" of the virtualization function 1082 indicates that the virtualization function is enabled at the physical port identified by the physical port ID 1081. A value "OFF" of the virtualization function 1082 indicates that the virtualization function is disabled at the physical port identified by the physical port ID 1081.

The resource user virtual network ID 1083 is a virtual network ID for identifying the terminal 8 of a resource user.

The virtual network ID 1084 is information for uniquely identifying a virtual network (for example, an identifier).

The resource user VLAN for virtual network 1085 is a VLAN for virtual network that is recognized by the terminal 8 of the resource user.

The VLAN for virtual network 1086 is information for uniquely identifying a VLAN that is used by the virtual network (for example, an identifier).

The resource user VLAN 1087 is information for uniquely identifying a resource user VLAN that is created through virtualization by the virtual network of the entry (for example, an identifier). The resource user VLAN 1087 is one of VLANs that are used in the logical infrastructures 7 by logical infrastructure users and resource users, and a VLAN recognizable to the terminal 8 of the resource user.

FIG. 15 shows an example of the resource utilization state reference management table 610. Each entry in the resource utilization state reference management table 610 includes a resource user ID 1090, a resource type 1091, and a utilization reference 1092.

The resource user ID 1090 is information for uniquely identifying a resource user who uses one of the terminals 8 (for example, an identifier).

The resource type 1091 is information that indicates a resource type such as "host computer", "storage", or "appliance".

The resource reference 1092 is information that indicates a reference for determining the excess or shortage of resources, or the like.

Figure 16:
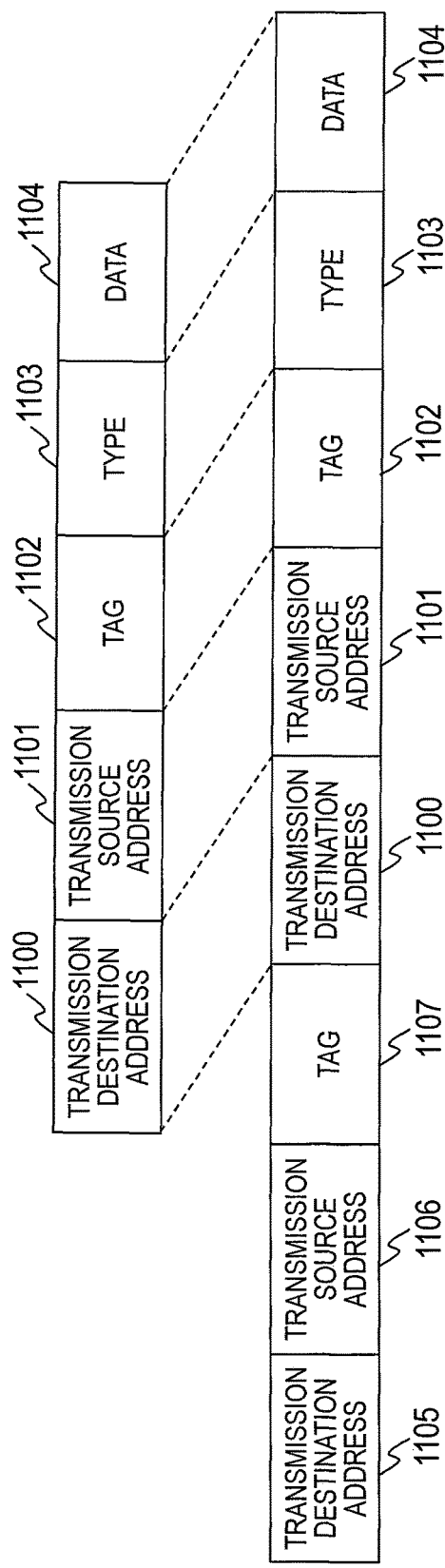
FIG. 16 is a diagram illustrating an example of the communication data structure prior to virtualization by a network virtualizing function according to the first embodiment.

FIG. 16 is a diagram illustrating an example of the communication data structure to be virtualized by a network virtualizing function, for example, overlay network virtualization such as VXLAN, NVGRE, or STT (the upper half of FIG. 16), and the communication data structure after the virtualization (the lower half of FIG. 16).

This embodiment is not limited to overlay network virtualization, and other network virtualization protocols such as hop-by-hop virtualization may be used.

In the upper half of FIG. 16, communication to be virtualized is expressed as an Ethernet communication frame that includes fields 1100 to 1104, and FIG. 16 illustrates an example in which the communication frame is encapsulated by the network virtualization function in an IP communication packet of the lower half of FIG. 16. However, this invention is not limited to the communication frame structure (1100 to 1107) and the network virtualization protocol that are premises of FIG. 16.

For instance, network virtualization may be accomplished by attaching a tag 1107, or a proprietary communication frame may be used.

A transmission destination address 1100 is a field that stores network identification information for identifying a communication destination uniquely throughout the network.

A transmission source address 1101 is a field that stores network identification information for identifying a communication source uniquely throughout the network.

A tag 1102 is a field that stores identification information for classifying the communication, and is a field for a virtual LAN (VLAN) tag, for example.

A type 1103 is a field that stores protocol type information, and is a field for a protocol number of, for example, TCP or the User Datagram Protocol (UDP).

Data 1104 is a field that stores arbitrary data exchanged with the communication destination.

A transmission destination address 1105 is a field that stores network identification information for identifying uniquely throughout the network a communication destination after the encapsulation by the network virtualization function 104 or 206.

A transmission source address 1106 is a field that stores network identification information for identifying uniquely throughout the network a communication source after the encapsulation by the network virtualization function 104 or 206.

The tag 1107 is information for uniquely identifying a virtual network, for example, a VNI in VXLAN.

The configuration described above enables the data center infrastructure 4 to build a virtual network by attaching the fields 1105 to 1107 in addition to the VLAN of the tag 1102.

Figure 17:
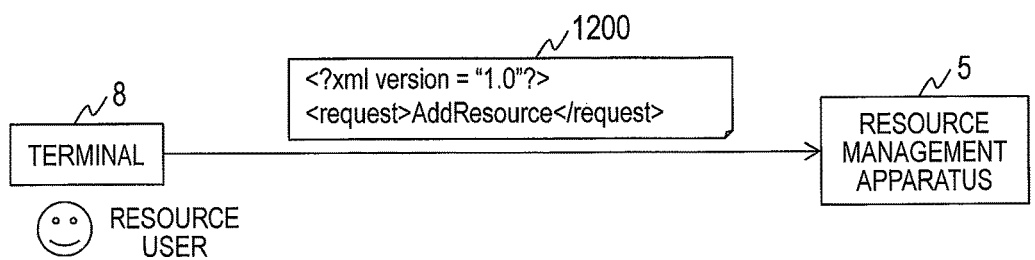
FIG. 17 is a diagram illustrating an example of request data that is transmitted when the terminal of a resource user requests the resource management apparatus to execute a resource configuration change according to the first embodiment.

FIG. 17 is a diagram illustrating an example of request data that is transmitted when the terminal 8 of a resource user requests the resource management apparatus 5 to add or delete logical network apparatus, to add resources or receive returned resources, or to execute a resource configuration change which involves, among others, grasping the resource utilization state.

A message 1200 is the request data transmitted from the resource user's terminal 8 to the resource management apparatus 5.

In the example of FIG. 17, the resource user's terminal 8 transmits to the resource management apparatus 5 a request to add a resource.

The message 1200 is transmitted via a CLI, a GUI, an API, or the like. A protocol used in the transmission can be a publicly-known or well-known protocol such as Telecommunication Network (TELNET), Secure Shell (SSH), or Hypertext Transfer Protocol (HTTP), or may be a proprietary protocol.

The message 1200 can have a publicly-known or well-known format such as Extensible Markup Language (XML), or a proprietary format.

While FIG. 17 takes XML as an example, this invention is not limited to any particular protocol or format.

Figure 18:
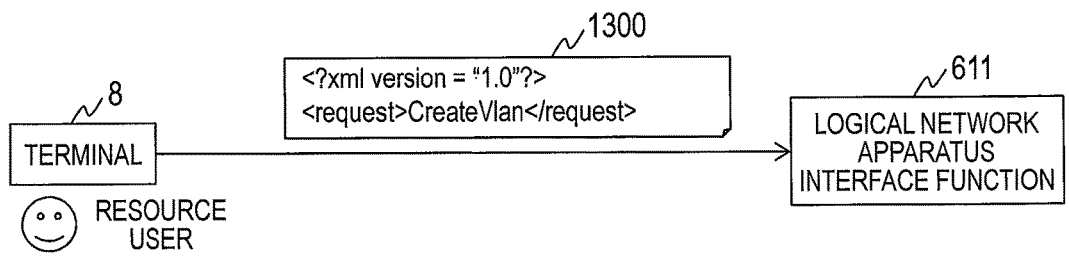
FIG. 18 is a diagram illustrating an example of request data that is transmitted when the terminal of a resource user requests the logical network apparatus interface function to execute a configuration change of logical network apparatus according to the first embodiment.

FIG. 18 is a diagram illustrating an example of request data that is transmitted when the terminal 8 of a resource user requests the logical network apparatus interface function 611 to execute a configuration change of logical network apparatus (logical service network apparatus or logical infrastructure network apparatus).

A message 1300 is the request data transmitted from the resource user's terminal 8 to the logical network apparatus interface function 611.

In the example of FIG. 18, the resource user's terminal 8 transmits to the logical network apparatus interface function 611 a request to add a VLAN.

The message 1300 is transmitted via a CLI, a GUI, an API, or the like. A protocol used in the transmission can be a publicly-known or well-known protocol such as TELNET, SSH, or HTTP, or may be a proprietary protocol.

The message 1300 can have a publicly-known or well-known format such as XML, or a proprietary format. While FIG. 18 takes XML as an example, this invention is not limited to any particular protocol or format.

Figure 19:
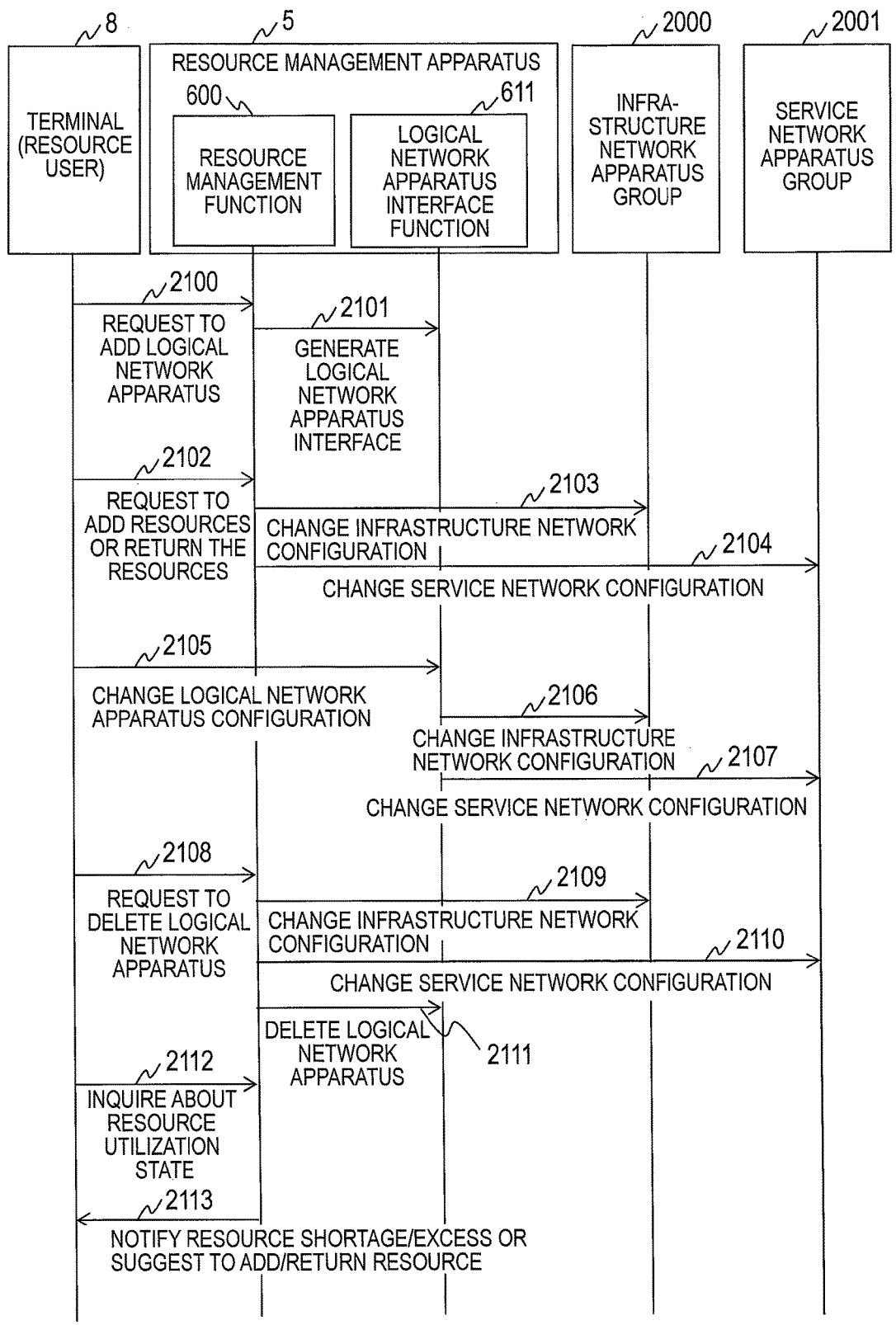
FIG. 19 is a diagram illustrating an example of an overall sequence in which the terminal of a resource user executes according to the first embodiment.

FIG. 19 is a diagram illustrating an example of an overall sequence in which the terminal 8 of a resource user executes, via the resource management apparatus 5, the addition or deletion of a logical network apparatus, the addition or return of resources, a change of a logical network apparatus configuration, and the obtaining of the resource utilization state.

In FIG. 19, an infrastructure network apparatus group 2000 represents at least one infrastructure network apparatus 203 and a service network apparatus group 2001 represents at least one service network apparatus 200 for simpler illustration.

In Step 2100, the resource user's terminal 8 requests the resource management function 600 of the resource management apparatus 5 to add a logical network apparatus (a logical service network apparatus or a logical infrastructure network apparatus).

In Step 2101, the resource management function 600 of the resource management apparatus 5 generates the logical network apparatus interface function 611 that is associated with the logical network apparatus of the addition request.

In Step 2102, the resource user's terminal 8 requests the resource management function 600 to add the resource 1 or return the resource 1.

In Step 2103, the resource management function 600 changes the configuration of the relevant infrastructure network apparatus 203 on the basis of the resource addition or return request, and couples or decouple the resource 1 to or from a logical network apparatus that is recognized on the resource user's terminal 8.

In Step 2104, the resource management function 600 changes the configuration of the relevant service network apparatus 200 on the basis of the resource addition or return request, and couples or decouples the resource 1 to or from a logical network apparatus that is recognized on the resource user's terminal 8.

In Step S2105, the resource user's terminal 8 executes the change of the logical network apparatus configuration on the logical network apparatus interface function 611.

In Step 2106, the resource management function 600 controls the infrastructure network apparatus 203 so that the logical network apparatus configuration change is reflected on the relevant infrastructure network apparatus 203, on the basis of the association between logical network apparatus and physical network apparatus.

In Step 2107, the resource management function 600 controls the service network apparatus 200 so that the logical network apparatus configuration change is reflected on the relevant service network apparatus 200, on the basis of the association between logical network apparatus and physical network apparatus.

In Step 2108, the resource user's terminal 8 requests the resource management function 600 to delete a logical network apparatus.

In Step 2109, the resource management function 600 changes the configuration of the relevant infrastructure network apparatus 203 on the basis of the deletion request, and deletes settings related to the logical network apparatus to be deleted.

In Step 2110, the resource management function 600 changes the configuration of the relevant service network apparatus on the basis of the deletion request, and deletes settings related to the logical network apparatus to be deleted.

In Step S2111, the resource management function 600 deletes the logical network apparatus interface function 611 that is relevant to the deletion request.

In Step 2112, the resource user's terminal 8 makes an inquiry to the resource management function 600 about the resource utilization state.

In Step 2113, the resource management function 600 sends to the resource user's terminal 8 a resource shortage/excess notification and a suggestion to add or return a resource, on the basis of the resource utilization reference 1092 of FIG. 15.

Figure 20A:
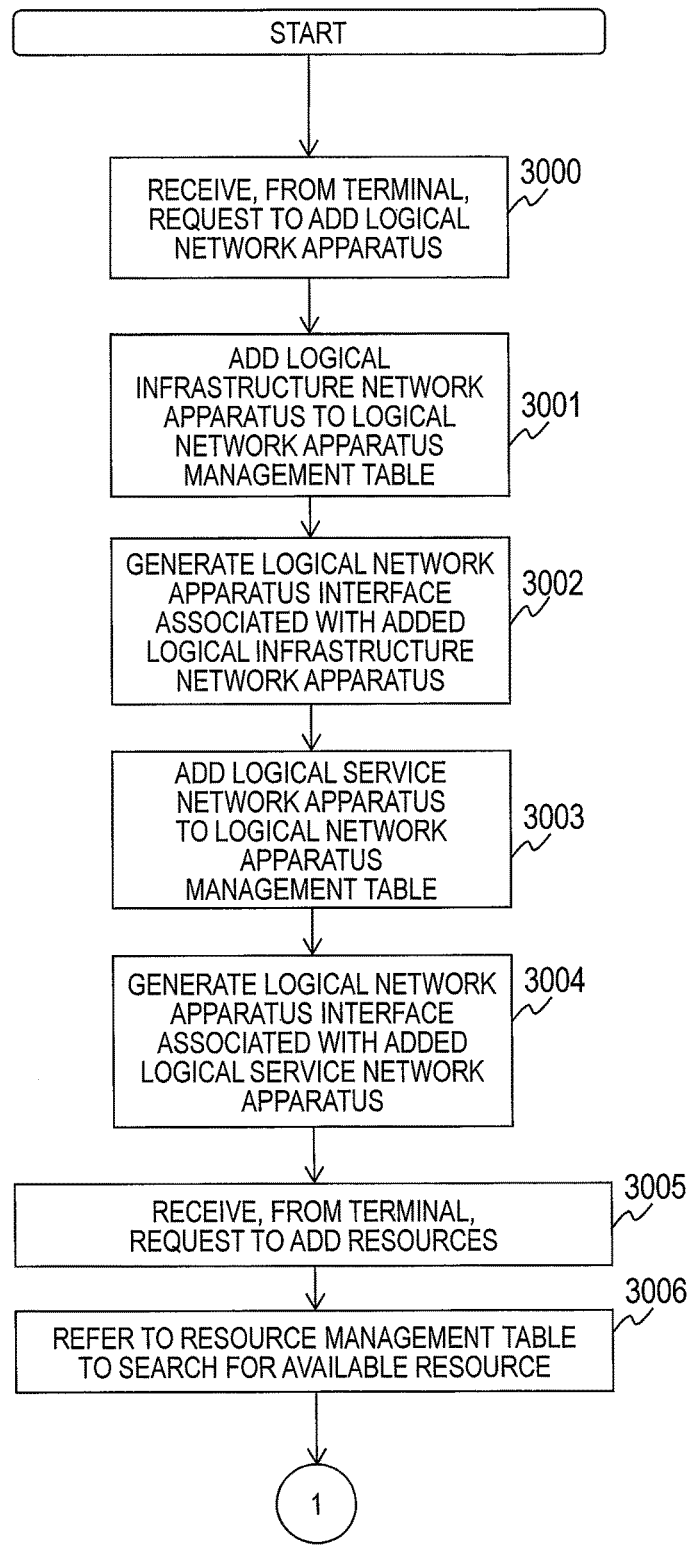
FIG. 20A is a first-half of a flow chart illustrating an example of processing of adding a logical network apparatus and a resource according to the first embodiment.
Figure 20B:
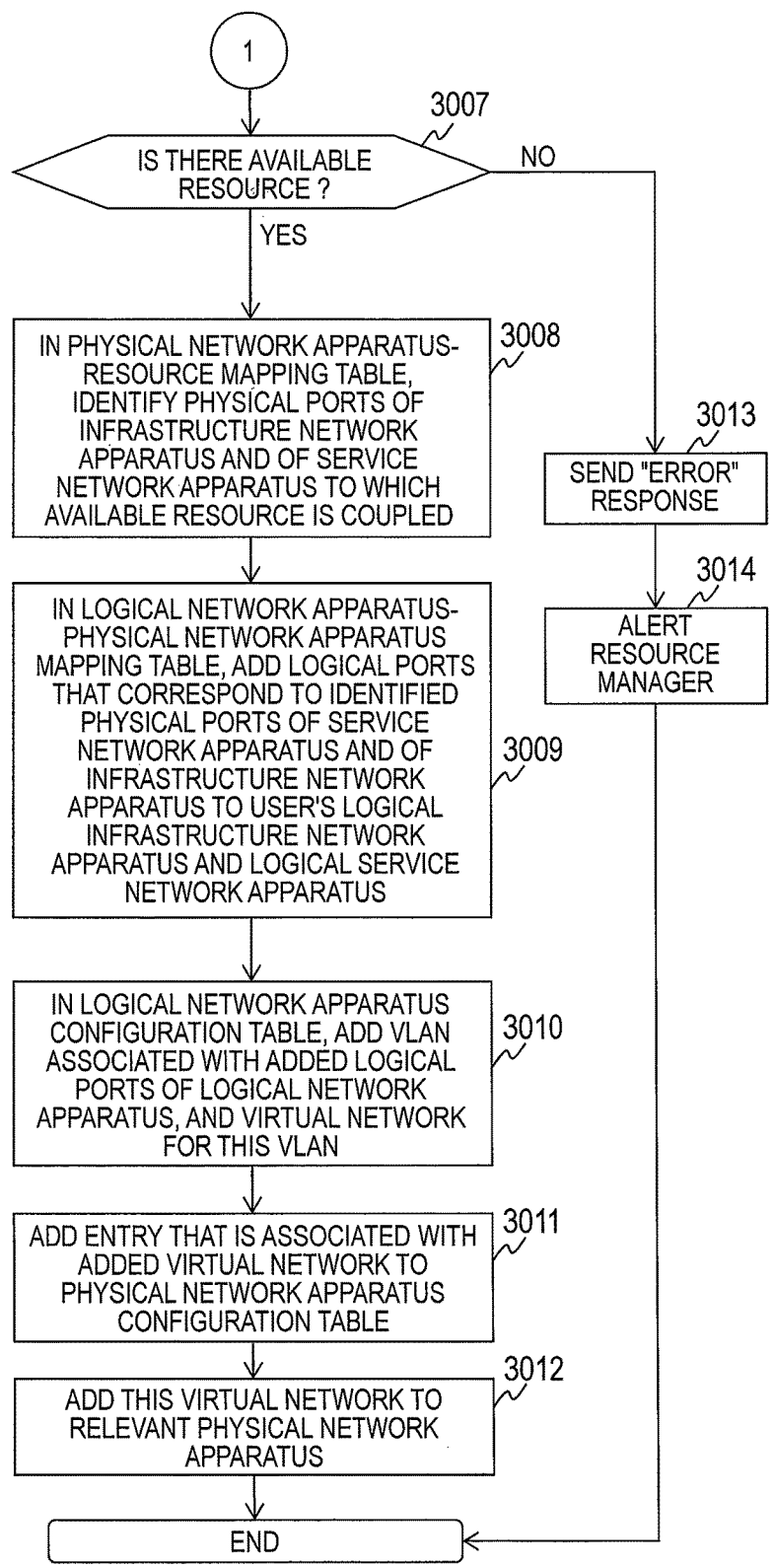
FIG. 20B is a second-half of a flow chart illustrating an example of processing of adding a logical network apparatus and a resource according to the first embodiment.

FIG. 20 is a flow chart illustrating an example of processing of adding a logical network apparatus and a resource. The processing of this flow chart is executed when the resource management apparatus 5 receives an addition request from one of the terminals 8. The following example is of a case where the terminal 8 requests the addition of a logical infrastructure.

In Step 3000, the resource management function 600 receives from the terminal 8 of a resource user a request to add a logical network apparatus.

In Step 3001, the resource management function 600 adds an entry for a logical infrastructure network apparatus (the logical network apparatus ID 1031) to the logical network apparatus management table 604 of FIG. 9. In the added entry of the logical network apparatus management table 604, the resource management function 600 sets an ID that is assigned in advance to the resource user of the terminal 8 as the resource user ID 1030, sets "infrastructure" as the type 1032 because the apparatus to be added is a logical infrastructure network apparatus, and assigns a value that is unique throughout the data center infrastructure 4 as the management address 1033.

In the example of FIG. 9, the entry has "user A" as the resource user ID 1030, "logical infrastructure network apparatus x" as the logical network apparatus ID 1031, and "f.f.f.f" as the management address 1033.

In Step 3002, the resource management function 600 generates the logical network apparatus interface function 611 that is associated with the logical infrastructure network apparatus (the logical network apparatus ID 1031) added in Step 3001. This enables the resource management apparatus 5 to provide a user interface through which the terminal 8 sets the logical infrastructure network apparatus.

In Step 3003, the resource management function 600 adds a logical service network apparatus (the logical network apparatus ID 1031) to the logical network apparatus management table 604. In the added entry of the logical network apparatus management table 604, the resource management function 600 sets the ID that is assigned in advance to the resource user of the terminal 8 as the resource user ID 1030, sets "service" as the type 1032 because the apparatus to be added is a logical service network apparatus, and assigns a value unique throughout the data center infrastructure 4 as the management address 1033.

In the example of FIG. 9, the entry has "user A" as the resource user ID 1030, "logical service network apparatus w" as the logical network apparatus ID 1031, and "e.e.e.e" as the management address 1033.

In Step 3004, the resource management function 600 generates the logical network apparatus interface function 611 that is associated with the logical service network apparatus added in Step 3003. This enables the resource management apparatus 5 to provide a user interface through which the terminal 8 sets the logical service network apparatus.

In Step 3005, the resource management function 600 receives from the resource user's terminal 8 a request to add the resource 1. Described here is an example in which a resource type is received as a request for the addition of the resource 1.

In Step 3006, the resource management function 600 refers to the resource user ID 1002 of the resource management table 601 illustrated in FIG. 6 to search for a resource that is not in use and accordingly is available out of resources that have the received resource type as the resource type 1001.

In Step 3007, the resource management function 600 determines whether or not there is an available resource on the basis of the result of the available resource search in Step 3006. The resource management function 600 proceeds to Step 3008 when there is an available resource, and proceeds to Step 3013 when there is no available resource.

In Step 3008, the resource management function 600 obtains the resource ID 1000 of the available resource from the resource management table 601. The resource management function 600 refers to the resource ID 1022 of the physical network apparatus-resource mapping table 603 of FIG. 8, and identifies physical ports to which the resource having the obtained resource ID is coupled, out of the physical ports p-1 to s-2 of the infrastructure network apparatus 203 and the service network apparatus 200, by way of the physical network apparatus ID 1020 and the physical port ID 1021. In the case where the available resource has an ID "m-1", for example, "service network apparatus p" and "infrastructure network apparatus r" are found as the physical network apparatus ID 1020 that is associated with this resource, and "p-1" and "r-1" are found as the physical port ID 1021 that is associated with this resource.

In Step 3009, the resource management function 600 generates, for the logical infrastructure network apparatus x generated in Step 3001 and the logical service network apparatus w generated in Step 3003, logical ports corresponding to the physical ports of the infrastructure network apparatus 203 and the service network apparatus 200 that have been identified in Step 3008. The resource management function 600 adds the generated logical ports to the logical network apparatus-physical network apparatus mapping table 605 of FIG. 10.

When the identified physical port has "p-1" as the physical port ID 1021 as in the example described above, the resource management function 600 adds an entry where the logical network apparatus ID 1040 is "logical service network apparatus w", and sets "p-1" as the physical port ID 1043, "w-1" as the logical port ID 1041, and "service network apparatus p" as the physical network apparatus ID 1042 in the added entry.

When the identified physical port has "r-1" as the physical port ID 1021 as in the example described above, the resource management function 600 adds an entry where the logical network apparatus ID 1040 is "logical infrastructure network apparatus x", and sets "r-1" as the physical port ID 1043, "x-1" as the logical port ID 1041, and "infrastructure network apparatus r" as the physical network apparatus ID 1042 in the added entry.

In Step 3010, the resource management function 600 uses the virtual network management table 606 of FIG. 11 to allocate the resource user VLAN 1054 to which the available resource (m-1) is coupled and a virtual network whose virtual network ID 1051 is associated with the VLAN.

The VLAN allocated here can be, for example, a default VLAN. The resource management function 600 uses the VLAN management table 607 to further allocate a VLAN for virtual network that is used by the allocated virtual network.

The resource management function 600 adds the resource user VLAN 1054, the virtual network ID 1051, and information of the VLAN for virtual network to the logical network apparatus configuration table 608 of FIG. 13.

In Step 3011, the resource management function 600 adds the settings added to the logical network apparatus in Step 3010 to the physical network apparatus configuration table 609 of FIG. 14, on the basis of the association relations between logical network apparatus and physical network apparatus which are shown in FIG. 10.

In Step 3012, the resource management function 600 sets the settings added to the physical network apparatus configuration table 609 in Step 3011 in the relevant physical network apparatus.

In Step 3013, the resource management function 600 sends to the resource user's terminal 8 an "error" response that informs of the lack of available resources.

In Step 3014, the resource management function 600 issues an alert that informs of the lack of available resources to the display unit 503 that is used by the resource manager.

Through the processing described above, when a request to add a logical network apparatus and the resource 1 is received from the terminal 8 of a resource user and there is an available resource, the resource management function 600 of the resource management apparatus 5 generates the logical network 70 (a logical service network apparatus and a logical infrastructure network apparatus), and allocates the resource 1 and a virtual network.

Figure 21:
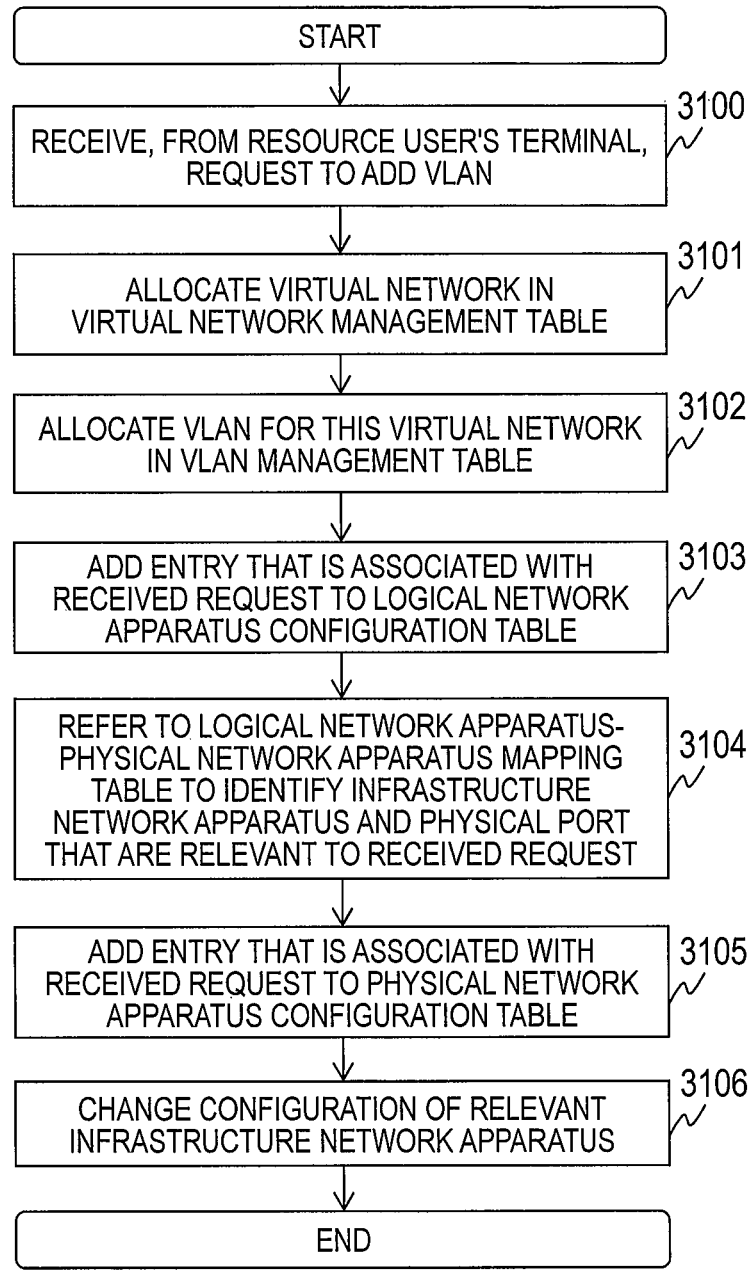
FIG. 21 is a flow chart illustrating an example of processing of adding a VLAN to a logical infrastructure network apparatus according to the first embodiment.

FIG. 21 is a flow chart illustrating an example of processing of adding a VLAN to a logical infrastructure network apparatus. This processing is executed when the resource management apparatus 5 receives from one of the terminals 8 a request to add a VLAN to the logical infrastructure network apparatus 401 or 403.

In Step 3100, the logical network apparatus interface function 611 of the resource management apparatus 5 receives from the terminal 8 of a resource user a request to add a VLAN. The request for the addition of a VLAN includes the resource user VLAN 1075, the logical network apparatus ID 1070, and the logical port ID 1071, which are shown in FIG. 13.

In Step 3101, the logical network apparatus interface function 611 allocates a virtual network whose virtual network ID 1073 is associated with the VLAN requested to be added (the resource user VLAN 1075) in the virtual network management table 606 of FIG. 11.

In Step 3102, the logical network apparatus interface function 611 allocates a VLAN for virtual network that is associated with the virtual network requested to be added in the VLAN management table 607 of FIG. 12.

In Step 3103, the logical network apparatus interface function 611 adds the VLAN and virtual network requested to be added and information of the VLAN for virtual network in association with the logical port of the logical infrastructure network apparatus of the addition request in the logical network apparatus configuration table 608 of FIG. 13.

In Step 3104, the logical network apparatus interface function 611 refers to the logical network apparatus-physical network apparatus mapping table 605 of FIG. 10 to identify, out of the infrastructure network apparatus 203 and the physical ports 211 to 214, an infrastructure network apparatus and a physical port that are associated with the logical port ID 1071 of the requested logical infrastructure network apparatus 401 or 403.

In Step 3105, the logical network apparatus interface function 611 adds the settings added to the logical network apparatus in Step 3104 to the physical network apparatus configuration table 609 of FIG. 14, on the basis of the association relations between logical network apparatus and physical network apparatus.

In Step 3106, the logical network apparatus interface function 611 sets the settings added to the physical network apparatus configuration table 609 in Step 3105 in the relevant physical network apparatus.

Through the processing described above, a VLAN is set to, for example, the logical port x-1 of the logical infrastructure network apparatus x.

Figure 22:
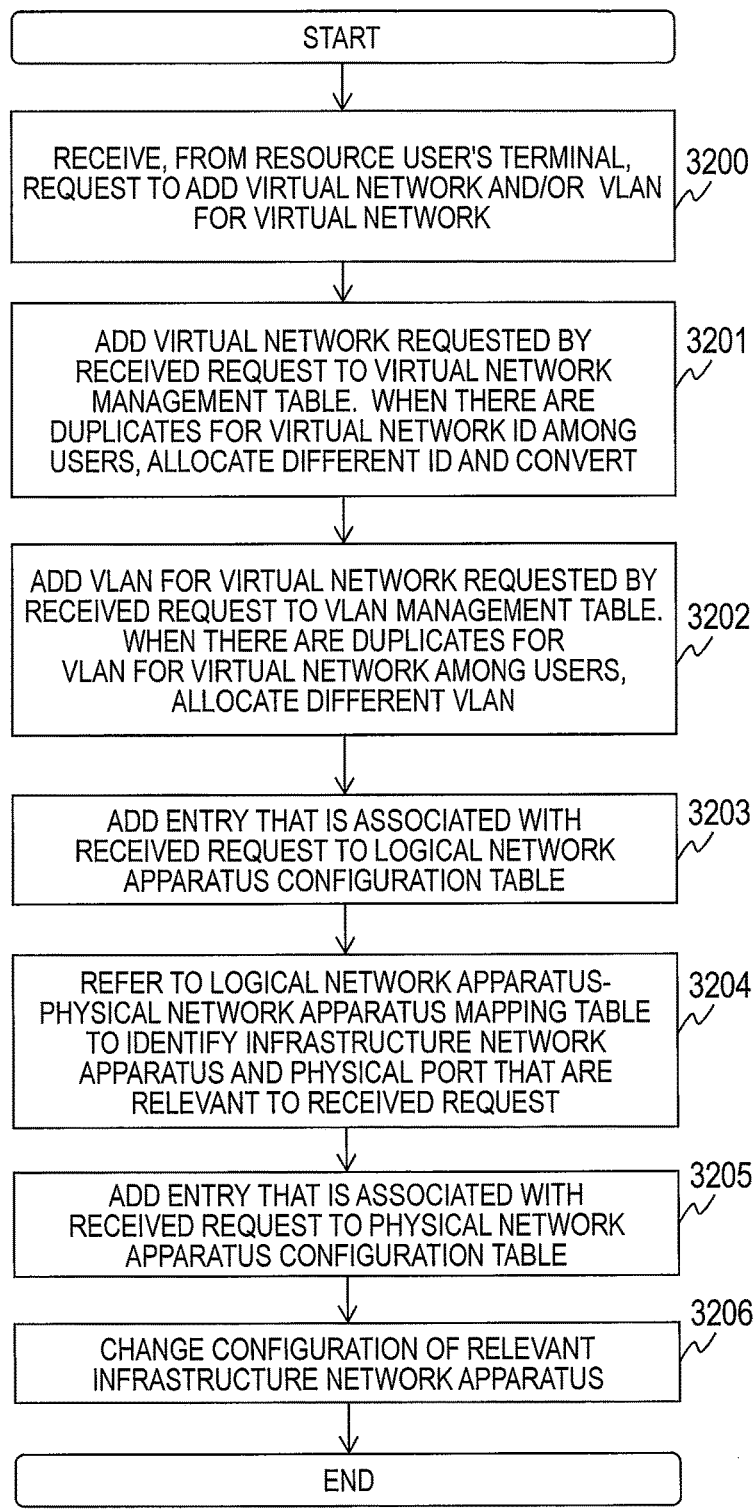
FIG. 22 is a flow chart illustrating an example of processing of adding a virtual network and a VLAN for virtual network to a logical service network apparatus according to the first embodiment.

FIG. 22 is a flow chart illustrating an example of processing of adding a virtual network and a VLAN for virtual network to a logical service network apparatus. This processing is executed when the resource management apparatus 5 receives, from one of the terminals 8, with regard to the logical network apparatus 400 or 402, a virtual network number (the virtual network ID 1073), a VLAN number (the resource user VLAN 1075), the logical network apparatus ID 1070 of a logical network apparatus to which a virtual network and VLAN identified by the received virtual network number and VLAN number are set, and the logical port ID 1071.

In Step 3200, the logical network apparatus interface function 611 of the resource management apparatus 5 receives from the terminal 8 of a resource user a request to add a virtual network and/or a VLAN for virtual network.

In Step 3201, the logical network apparatus interface function 611 allocates a virtual network whose virtual network ID 1051 matches the virtual network ID of the addition request in the virtual network management table 606 of FIG. 11. In the case where there are duplicates for the virtual network ID among resource users identified by the resource user IDs, the logical network apparatus interface function 611 assigns a different virtual network ID.

In Step 3202, the logical network apparatus interface function 611 allocates the VLAN for virtual network 1061 that matches the VLAN for virtual network of the addition request in the VLAN management table 607 of FIG. 12.

Specifically, the logical network apparatus interface function 611 adds an entry where the network type 1060 is "service network" to the VLAN management table 607, and stores the ID of the resource user who uses the terminal 8 as the resource user ID 1062, the resource user VLAN for virtual network of the resource user who uses the terminal 8 as the resource user VLAN for virtual network 1063, and the virtual network ID assigned in Step 3201 as the virtual network ID 1064. In the case where there are duplicates for the VLAN for virtual network 1061, a different VLAN for virtual network is allocated.

In Step 3203, the logical network apparatus interface function 611 adds the values set in Step 3202 to the logical network apparatus configuration table 608 of FIG. 13 as the VLAN for virtual network 1074, the virtual network ID 1073, and the resource user VLAN 1075 of the resource user who uses the terminal 8, in association with the logical port ID 1071 of the logical network apparatus that is included in the addition request.

In Step 3204, the logical network apparatus interface function 611 refers to the logical network apparatus-physical network apparatus mapping table 605 of FIG. 10 to identify, out of the service network apparatus (IDs 1042) and the physical port IDs 1043, a service network apparatus and a physical port ID that are associated with the logical port ID 1041 of the requested logical service network apparatus 400 or 402.

In Step 3205, the logical network apparatus interface function 611 adds the settings added to the logical network apparatus configuration table 608 in Step 3203 to the physical network apparatus configuration table 609 of FIG. 14, on the basis of the association relations between logical network apparatus and physical network apparatus of FIG. 10. Specifically, the logical network apparatus interface function 611 identifies an entry of the physical network apparatus configuration table 609 where the physical port ID 1081 matches the physical port ID 1043 identified in Step 3204, and sets the virtual network ID value and the VLAN value in the entry.

In Step 3206, the logical network apparatus interface function 611 sets, in the relevant physical network apparatus, the settings added in Step 3205 to the physical network apparatus configuration table 609.

Through the processing described above, adding a virtual network and a VLAN for virtual network to the logical network apparatus 400 or 402 is executed, and a logical service network apparatus and a logical infrastructure network apparatus are generated. From the logical service network apparatus and the logical infrastructure network apparatus, one logical network 70 which includes one logical service network 71 and one logical infrastructure network 72 is generated. The resource management apparatus 5 then adds the resource 1 to the logical network 70 in response to an addition request, thereby providing the logical infrastructure 7 to the resource user's terminal 8.

Figure 23:
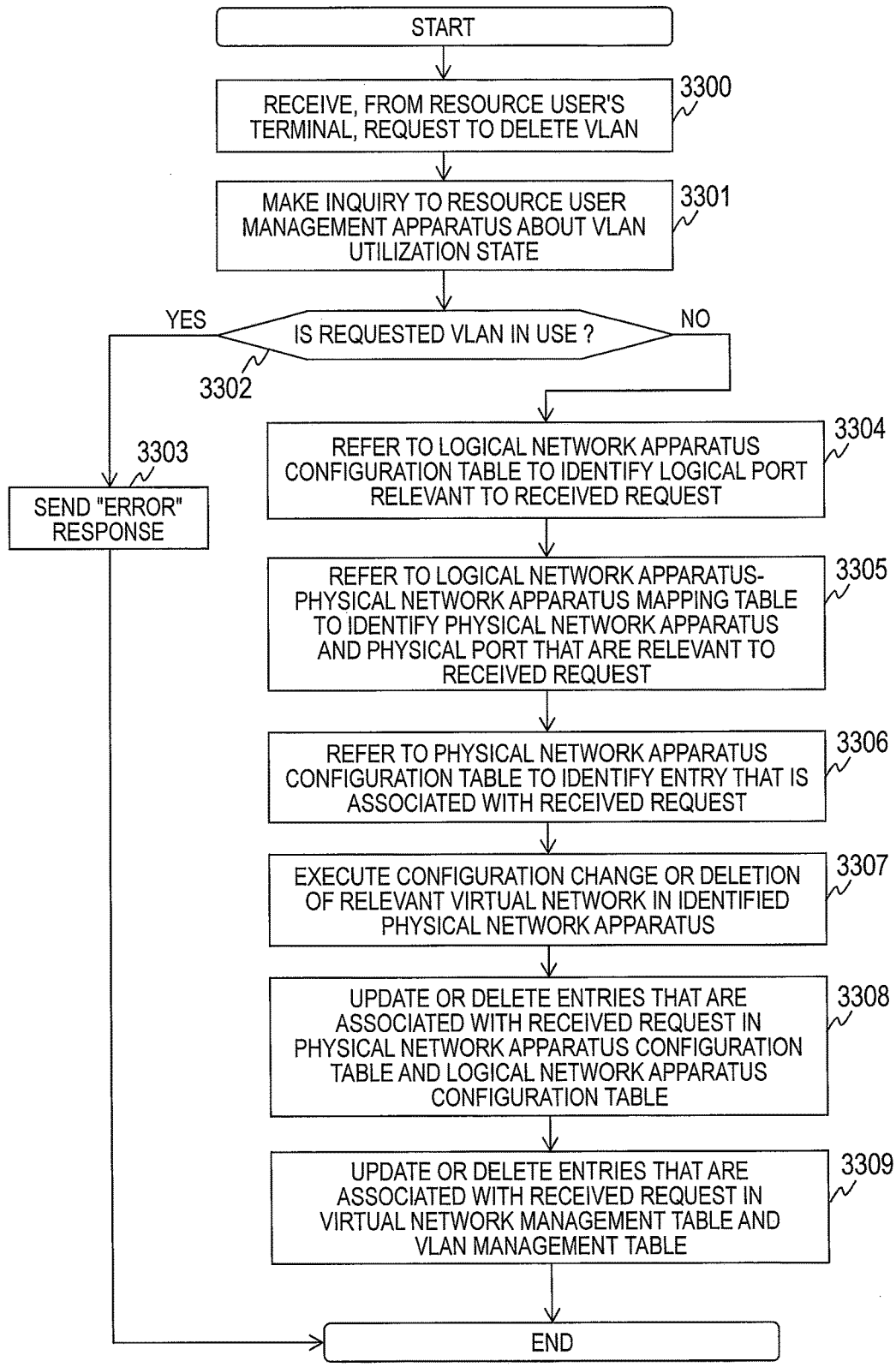
FIG. 23 is a flow chart illustrating an example of processing of deleting a VLAN from a logical infrastructure network apparatus according to the first embodiment.

FIG. 23 is a flow chart illustrating an example of processing of deleting a VLAN from a logical infrastructure network apparatus. This processing is executed when the resource management apparatus 5 receives from one of the terminals 8 a request to delete a VLAN of the logical infrastructure network apparatus 401 or 403.

In Step 3300, the logical network apparatus interface function 611 receives from the terminal 8 of a resource user a request to delete a VLAN. The request to delete a VLAN includes the resource user VLAN 1075.

In Step 3301, the logical network apparatus interface function 611 makes an inquiry to the resource user management apparatus 13 about the utilization state of the VLAN to be deleted. The logical network apparatus interface function 611 inquires whether or not the VLAN in question is in use from the resource user management apparatus 13 because a VLAN that is in use cannot be deleted. The inquiry contains a VLAN ID, status information of the VLAN, and the like. The inquiry is executed via an interface provided in advance in the resource user management apparatus 13, for example, an API.

In Step 3302, the logical network apparatus interface function 611 proceeds to Step 3303 when it is determined as a result of the inquiry that the VLAN to be deleted is in use, and proceeds to Step 3304 when it is determined that the VLAN is not in use. Steps 3301 and 3302 may be omitted so that the logical network apparatus interface function 611 proceeds to Step 3304 from Step 3300.

In Step 3303, the logical network apparatus interface function 611 sends to the resource user's terminal 8 an "error" response that informs of the fact that the requested VLAN is in use and cannot be deleted.

In Step 3304, the logical network apparatus interface function 611 refers to the logical network apparatus configuration table 608 of FIG. 13 to identify, from the resource user VLAN 1075 specified in the deletion request, the logical port ID 1071 that is relevant.

In Step 3305, the logical network apparatus interface function 611 refers to the logical network apparatus-physical network apparatus mapping table 605 of FIG. 10 to identify the physical network apparatus ID 1042 and the physical port ID 1043 that are associated with the identified logical port ID.

In Step 3306, the logical network apparatus interface function 611 refers to the physical network apparatus configuration table 609 of FIG. 14 to identify an entry where a resource user VLAN 1087 that matches the resource user VLAN 1075 specified in the deletion request is registered.

In Step 3307, the logical network apparatus interface function 611 issues a command to a physical network apparatus that has the physical network apparatus ID identified in Step 3306 to change the configuration of a virtual network that is associated with the VLAN to be deleted, or to delete the virtual network.

Specifically, in the case where a virtual network having the virtual network ID 1084 that is associated with the physical network apparatus ID identified in Step 3306 includes other VLANs than the VLAN requested to be deleted, only the VLAN that is associated with the resource user VLAN 1087 is deleted from the virtual network.

In the case where a virtual network having the virtual network ID 1084 that is associated with the physical network apparatus ID identified in Step 3306 includes only the resource user VLAN 1087, on the other hand, the virtual network having this virtual network ID 1084 is deleted.

In Step 3308, the logical network apparatus interface function 611 changes or deletes entries of the physical network apparatus configuration table 609 of FIG. 14 and the logical network apparatus configuration table 608 of FIG. 13 that hold the resource user VLAN 1075 of the deletion request, depending on what has been executed in Step 3307.

In Step 3309, the logical network apparatus interface function 611 changes or deletes entries of the virtual network management table 606 of FIG. 11 and the VLAN management table 607 of FIG. 12 that hold the virtual network and VLAN for virtual network associated with the resource user VLAN 1075 of the deletion request.

Figure 24:
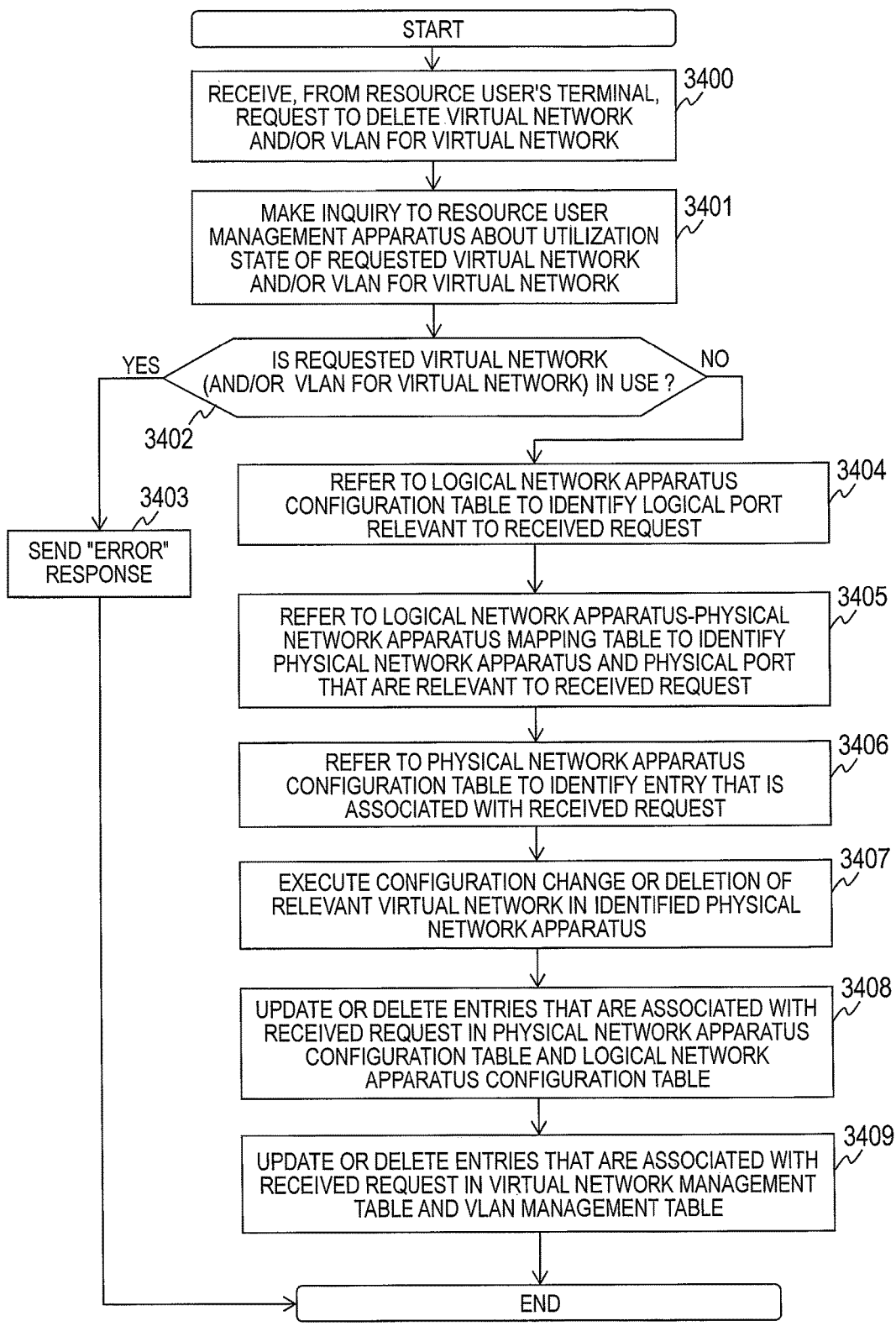
FIG. 24 is a flow chart illustrating an example of processing of deleting a virtual network and/or a VLAN for virtual network from a logical service network apparatus according to the first embodiment.

FIG. 24 is a flow chart illustrating an example of processing of deleting a virtual network and/or a VLAN for virtual network from a logical service network apparatus. This processing is executed when the resource management apparatus 5 receives from one of the terminals 8 a request to delete a virtual network and/or a VLAN for virtual network of the logical service network apparatus 400 or 402.

In Step 3400, the logical network apparatus interface function 611 receives from the terminal 8 of a resource user a request to delete a virtual network and/or a VLAN for virtual network.

In Step 3401, the logical network apparatus interface function 611 makes an inquiry to the resource user management apparatus 13 about the utilization state of the virtual network and/or VLAN for virtual network requested to be deleted. The resource user management apparatus 13 sends the resource utilization state of the virtual network and/or VLAN for virtual network requested to be deleted to the resource management apparatus 5 in response.

In Step 3402, the logical network apparatus interface function 611 proceeds to Step 3403 when it is determined that the virtual network and/or VLAN for virtual network requested to be deleted is in use by the logical network apparatus interface function 611, and proceeds to Step 3404 when it is determined that the virtual network and/or the VLAN for virtual network is not in use. Steps 3401 and 3402 may be omitted so that the logical network apparatus interface function 611 proceeds to Step 3404 from Step 3400.

In Step 3403, the logical network apparatus interface function 611 sends to the resource user's terminal 8 an "error" response that informs of the fact that the virtual network and/or VLAN for virtual network requested to be deleted is in use and cannot be deleted.

In Step 3404, the logical network apparatus interface function 611 refers to the logical network apparatus configuration table 608 of FIG. 13 to identify the logical port ID 1071 that is associated with the virtual network ID 1073 or the VLAN for virtual network 1074 specified in the deletion request.

In Step 3405, the logical network apparatus interface function 611 refers to the logical network apparatus-physical network apparatus mapping table 605 of FIG. 10 to identify the physical network apparatus ID 1042 and the physical port ID 1043 that are associated with the logical port ID identified in Step 3404.

In Step 3406, the logical network apparatus interface function 611 refers to the physical network apparatus configuration table 609 of FIG. 14 to identify an entry whose physical port ID 1081 is associated with the deletion request.

In Step 3407, the logical network apparatus interface function 611 changes the configuration of a virtual network (the virtual network ID 1084) that is associated with the VLAN for virtual network 1086 specified in the deletion request, with respect to the physical port ID 1081 of the physical network apparatus in the entry identified in Step 3406, or deletes the virtual network. Specifically, in the case where the virtual network specified in the deletion request includes other VLANs than the VLAN for virtual network 1086, only the VLAN for virtual network of the deletion request is deleted from the virtual network. In the case where the virtual network specified in the deletion request includes only the VLAN for virtual network of the deletion request, on the other hand, the logical network apparatus interface function 611 deletes this virtual network (the virtual network ID 1084).

In Step 3408, the logical network apparatus interface function 611 changes or deletes entries of the physical network apparatus configuration table 609 of FIG. 14 and the logical network apparatus configuration table 608 of FIG. 13 that hold the VLAN or virtual network changed in configuration, or deleted, in Step 3407.

In Step 3409, the logical network apparatus interface function 611 changes or deletes entries of the virtual network management table 606 of FIG. 11 and the VLAN management table 607 of FIG. 12 that hold the virtual network and VLAN for virtual network associated with the deletion request.

Figure 25A:
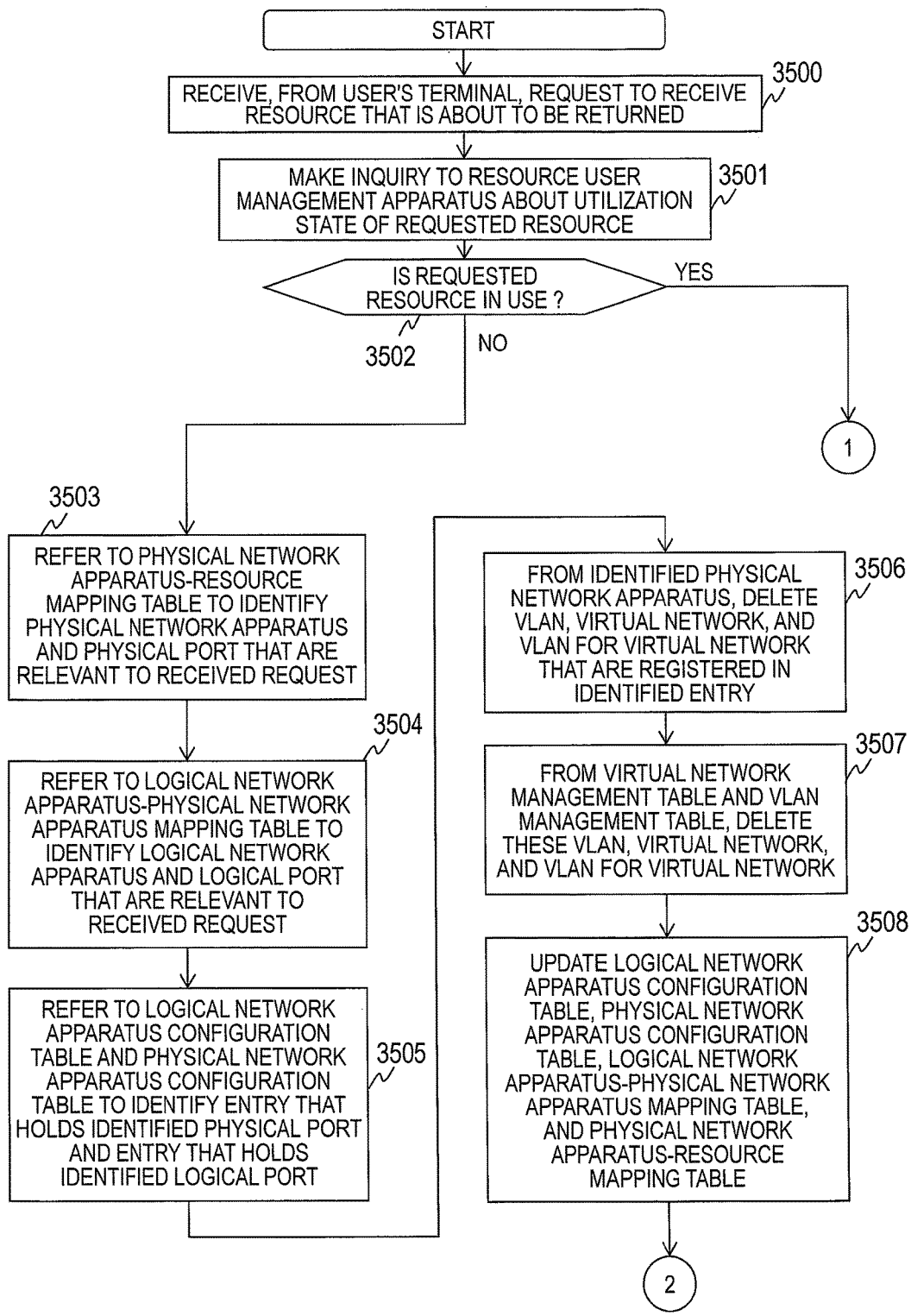
FIG. 25A is a first-half of a flow chart illustrating an example of steps of returning a resource and deleting a logical network apparatus according to the first embodiment.
Figure 25B:
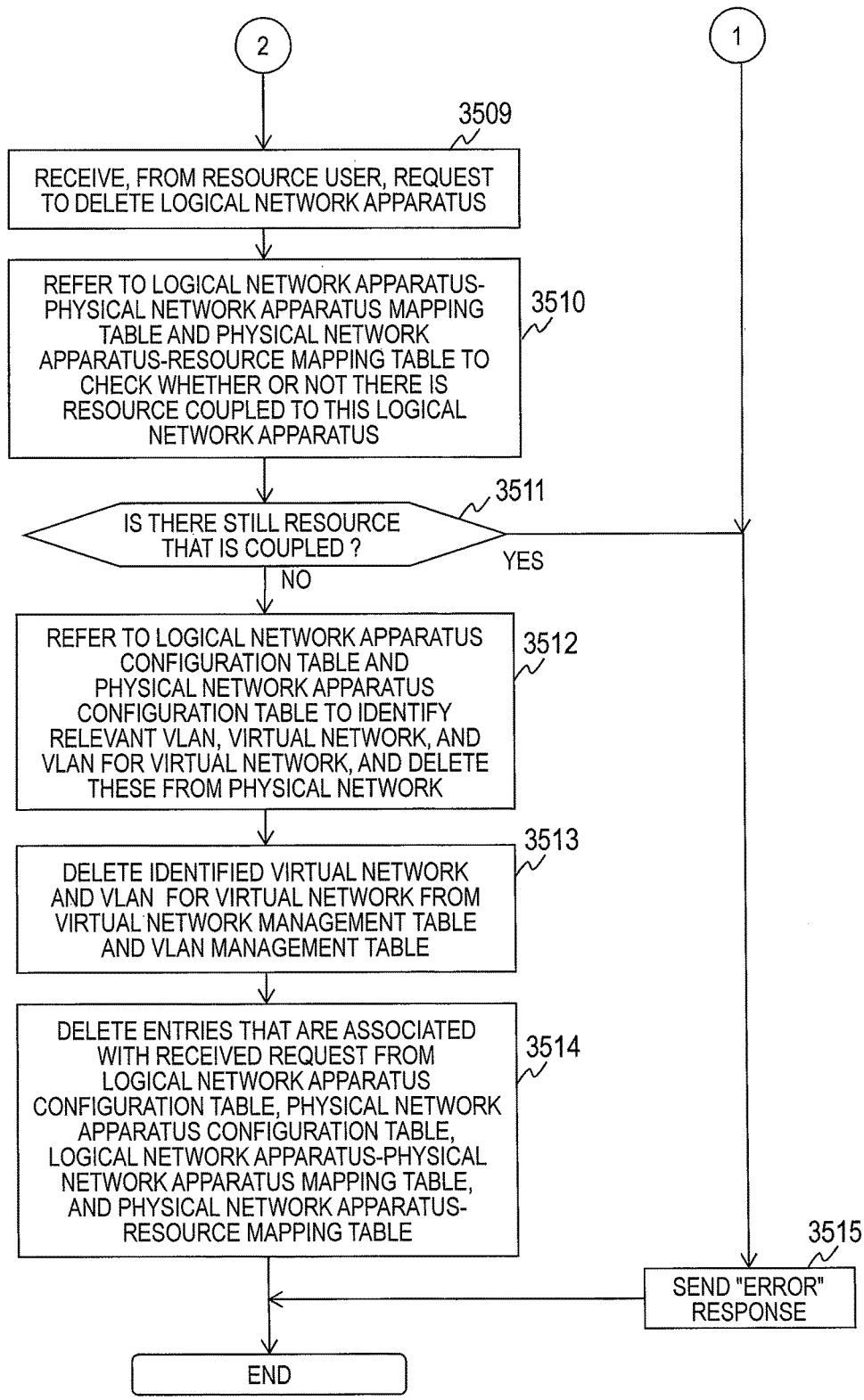
FIG. 25B is a second-half of a flow chart illustrating an example of steps of returning a resource and deleting a logical network apparatus according to the first embodiment.

FIG. 25 is a flow chart illustrating an example of steps of returning a resource and deleting a logical network apparatus. When a resource user returns a computer resource that has been allocated to the resource user by the resource manager to the data center infrastructure 4, the terminal 8 of the resource user transmits to the resource management apparatus 5 a request to receive a resource that is about to be returned.

In Step 3500, the resource management function 600 of the resource management apparatus 5 receives from the terminal 8 of a resource user a request to receive a resource that is about to be returned. The request to receive a resource to be returned includes the resource ID 1000 of the resource 1 to be returned.

In Step 3501, the resource management function 600 makes an inquiry to the resource user management apparatus 13 about the utilization state of the resource requested to be returned. The resource user management apparatus 13 obtains the utilization state of this resource from a resource utilization state table (not shown), and sends the obtained utilization state to the resource management apparatus 5 in response. The resource utilization state table (not shown) is a table that periodically collects, for each resource 1, the utilization state of the resource 1, for example, a table in which the processor utilization ratio or consumed memory capacity collected by a publicly-known or well-known method is stored. Alternatively, the resource management apparatus 5 may collect the resource utilization state of each resource 1 to store the collected utilization state in a table.

In Step 3502, the resource management function 600 proceeds to Step 3515 when it is determined that the resource to be returned is in use, and proceeds to Step 3503 when it is determined that the resource to be returned is not in use. Steps 3501 and 3502 may be omitted so that the resource management function 600 proceeds to Step 3503 from Step 3500.

In Step 3503, the resource management function 600 refers to the physical network apparatus-resource mapping table 603 of FIG. 8 to identify the resource ID 1022 that matches the resource ID 1000 specified in the return request, and to identify the physical network apparatus ID 1020 and the physical port ID 1021 that are associated with the identified resource ID 1022.

In Step 3504, the resource management function 600 refers to the logical network apparatus-physical network apparatus mapping table 605 of FIG. 10 to identify the logical network apparatus ID 1040 and the logical port ID 1041 that are associated with the physical network apparatus ID and physical port ID identified in Step 3503.

In Step 3505, the resource management function 600 refers to the logical network apparatus configuration table 608 of FIG. 13 and the physical network apparatus configuration table 609 of FIG. 14 to identify an entry that holds the identified logical port ID 1041 and an entry that holds the identified physical port ID 1021, respectively.

In Step 3506, the resource management function 600 deletes, from the entry identified in Step 3505 which holds the physical port ID of the physical network apparatus identified in Step 3503, the resource user VLAN for virtual network 1085, the VLAN for virtual network 1086, and the resource user VLAN 1087, and the resource user virtual network ID 1083 and the virtual network ID 1084.

In Step 3507, the resource management function 600 deletes, from the virtual network management table 606 of FIG. 11 and the VLAN management table 607 of FIG. 12, the VLAN, virtual network, and VLAN for virtual network deleted in Step 3506.

In Step 3508, the resource management function 600 updates the logical network apparatus configuration table 608 of FIG. 13, the physical network apparatus configuration table 609 of FIG. 14, the logical network apparatus-physical network apparatus mapping table 605 of FIG. 10, and the physical network apparatus-resource mapping table 603 of FIG. 8, and deletes entries related to the resource of the return request.

In Step 3509, the resource management function 600 receives from the resource user's terminal 8 a request to delete a logical network apparatus. The deletion request includes the ID of the logical network apparatus.

In Step 3510, the resource management function 600 refers to the logical network apparatus-physical network apparatus mapping table 605 of FIG. 10 and the physical network apparatus-resource mapping table 603 of FIG. 8 to determine whether or not there is a resource that is coupled to the logical network apparatus requested to be deleted.

In Step 3511, the resource management function 600 proceeds to Step 3515 when it is determined that a resource is coupled to the logical network apparatus requested to be deleted, and proceeds to Step 3512 when it is determined that no resource is coupled to the logical network apparatus requested to be deleted. Steps 3510 and 3511 may be omitted so that the resource management function 600 proceeds to Step 3512 from Step 3509.

In Step 3512, the resource management function 600 refers to the logical network apparatus configuration table 608 of FIG. 13 and the physical network apparatus configuration table 609 of FIG. 14, and, when there are a VLAN, a virtual network, and a VLAN for virtual network that are set in the logical network apparatus requested to be deleted, deletes the VLAN, the virtual network, and the VLAN for virtual network from the relevant physical network apparatus.

In Step 3513, the resource management function 600 refers to the virtual network management table 606 of FIG. 11 and the VLAN management table 607 of FIG. 12 to delete entries that hold the virtual network and VLAN for virtual network of the logical network apparatus requested to be deleted.

In Step 3514, the resource management function 600 updates the logical network apparatus configuration table 608 of FIG. 13, the physical network apparatus configuration table 609 of FIG. 14, the logical network apparatus-physical network apparatus mapping table 605 of FIG. 10, and the physical network apparatus-resource mapping table 603 of FIG. 8, and deletes entries related to the logical network apparatus of the deletion request.

In Step 3515, the resource management function 600 sends to the resource user's terminal 8 an "error" response that informs of the fact that the resource in question is in use and cannot be deleted.

Through the processing described above, a resource user can return a resource to the data center infrastructure 4 by canceling the allocation of the physical resource which is to be returned to the data center infrastructure 4 at the request of the terminal 8 of the resource user, and then deleting a logical network apparatus requested to be deleted.

Figure 26:
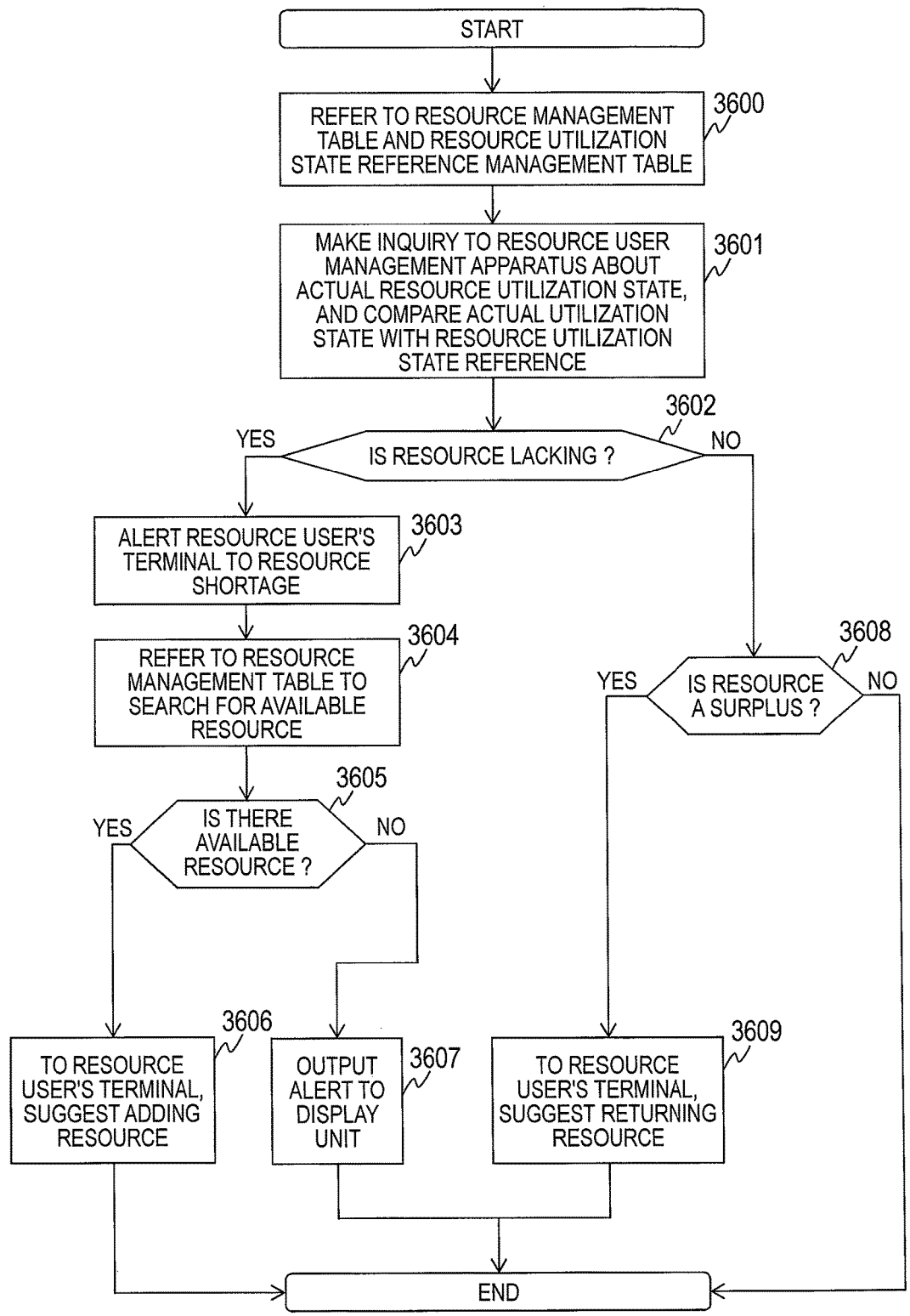
FIG. 26 is a flow chart illustrating an example of steps of notifying a resource shortage/excess and suggesting to add/return a resource according to the first embodiment.

FIG. 26 is a flow chart illustrating an example of steps of notifying a resource shortage/excess and suggesting to add/return a resource. The steps of this flow chart are executed regularly, or when the resource manager deems the procedure necessary and operates the input unit 504.

In Step 3600, the resource management function 600 refers to the resource management table 601 of FIG. 6 and the resource utilization state reference management table 610 of FIG. 7 to obtain, for each resource user, allocated resources and the resource utilization state reference 1092 associated with the allocated resources.

In Step 3601, the resource management function 600 makes an inquiry to the resource user management apparatus 13 about the actual utilization state of resources allocated to each resource user. The resource management function 600 checks the resource utilization state sent from the resource user management apparatus 13 in response against the resource utilization state reference 1092 obtained in Step 3600, and determines whether the resource user is in short of or excess of resources.

In Step 3602, the resource management function 600 proceeds to Step 3603 when it is determined that the resource user is in short of resources, and proceeds to Step 3608 when it is determined that the resource user is not in short of resources.

In Step 3603, the resource management function 600 alerts the terminal 8 of the resource user to a shortage of resources.

In Step 3604, the resource management function 600 refers to the resource management table 601 to determine whether or not there is an available resource.

In Step 3605, the resource management function 600 proceeds to Step 3606 when it is determined that there is an available resource, and proceeds to Step 3607 when it is determined that there is no available resource.

In Step 3606, the resource management function 600 suggests, to the resource user's terminal 8, adding the available resource.

In Step 3607, the resource management function 600 outputs a given alert to the display unit 503 of the resource management apparatus 5 to alert the resource manager to a shortage of available resources.

In Step 3608, the resource management function 600 determines whether or not the resource user is allocated resources in excess. The resource management function 600 proceeds to Step 3609 when it is determined that the resource user is in excess of resources, and ends the processing when it is determined that the resource user is not in excess of resources.

In Step 3609, the resource management function 600 transmits to the resource user's terminal 8 a notification that suggests returning excessive resources.

Through the processing described above, whether a resource user is in short of or excess of allocated resources is determined on the basis of the resource utilization state reference 1092, and a suggestion to add a resource is transmitted to the terminal 8 of a resource user who is in short of allocated resources and a suggestion to return a resource is transmitted to the terminal 8 of a resource user who is in excess of resources. The processing can be executed for all resource users, one resource user at a time.

Figure 27:
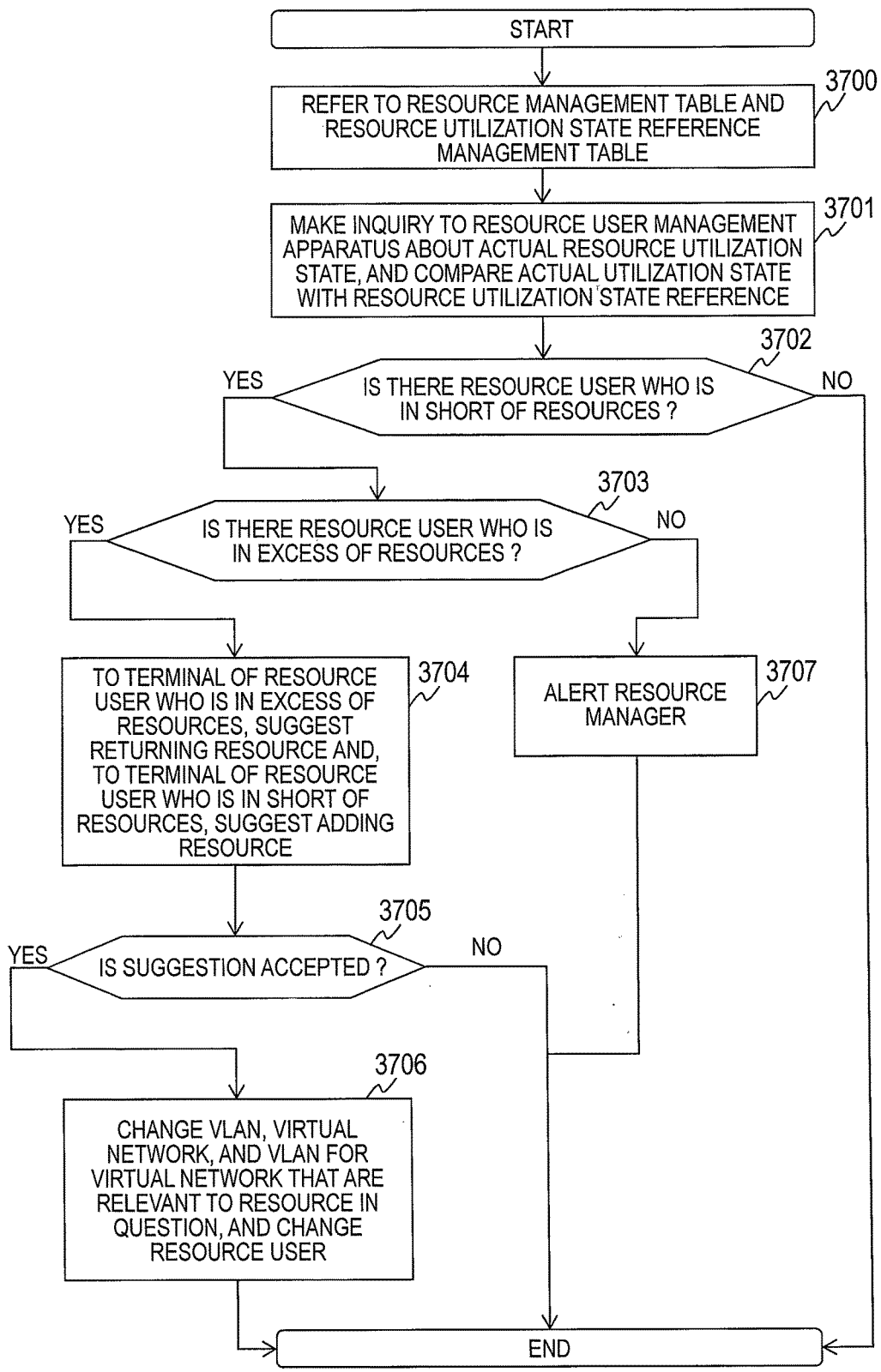
FIG. 27 is a flow chart illustrating an example of resource user changing processing according to the first embodiment.

FIG. 27 is a flow chart illustrating an example of resource user changing processing. The processing of this flow chart is executed regularly or when the resource manager deems the processing necessary.

In Step 3700, the resource management function 600 refers to the resource management table 601 of FIG. 6 and the resource utilization state reference management table 610 of FIG. 15 to obtain, for each resource user, allocated resources and the resource utilization state reference 1092 associated with the allocated resources.

In Step 3701, the resource management function 600 makes an inquiry to the resource user management apparatus 13 about the actual utilization state of resources allocated to each resource user. The resource management function 600 checks the resource utilization state sent from the resource user management apparatus 13 in response against the resource utilization state reference 1092 obtained in Step 3600, and determines whether each resource user is in short of or excess of resources.

In Step 3702, the resource management function 600 proceeds to Step 3703 when it is determined that there is a resource user who is in short of resources, and ends this flow when it is determined that there is no resource user who is in short of resources.

In Step 3703, the resource management function 600 proceeds to Step 3704 when it is determined that there is a resource user who is in excess of resources, and proceeds to Step 3708 when it is determined that there is no resource user who is in excess of resources.

In Step 3704, the resource management function 600 transmits to the terminal 8 of a resource user who is in excess of resources a notification that suggests returning a resource, and transmits to the terminal 8 of a resource user who is in short of resources a notification that suggests adding a resource.

In Step 3705, the resource management function 600 proceeds to Step 3706 in the case where the resource user's terminal 8 has accepted the suggestion of the resource management function 600 in Step 3704, and ends this processing in the case where the suggestion has not been accepted.

In Step 3706, the resource management function 600 identifies the resource 1 to be added/returned, and a VLAN, a virtual network, a VLAN for virtual network, and logical network apparatus that are related to this resource 1. The resource management function 600 deletes settings about the logical network 70 of the resource user who is in excess of resources with respect to the identified resource 1, and adds the identified resource 1 to the resource user who is in short of resources. The resource 1 is added in the manner described above.

Through the processing described above, each resource user is checked for an excess or shortage of resources, and the allocation of the resource 1 can be changed from a resource user who is in excess of resources to a resource user who is in short of resources.

Figures 28A, 28B:
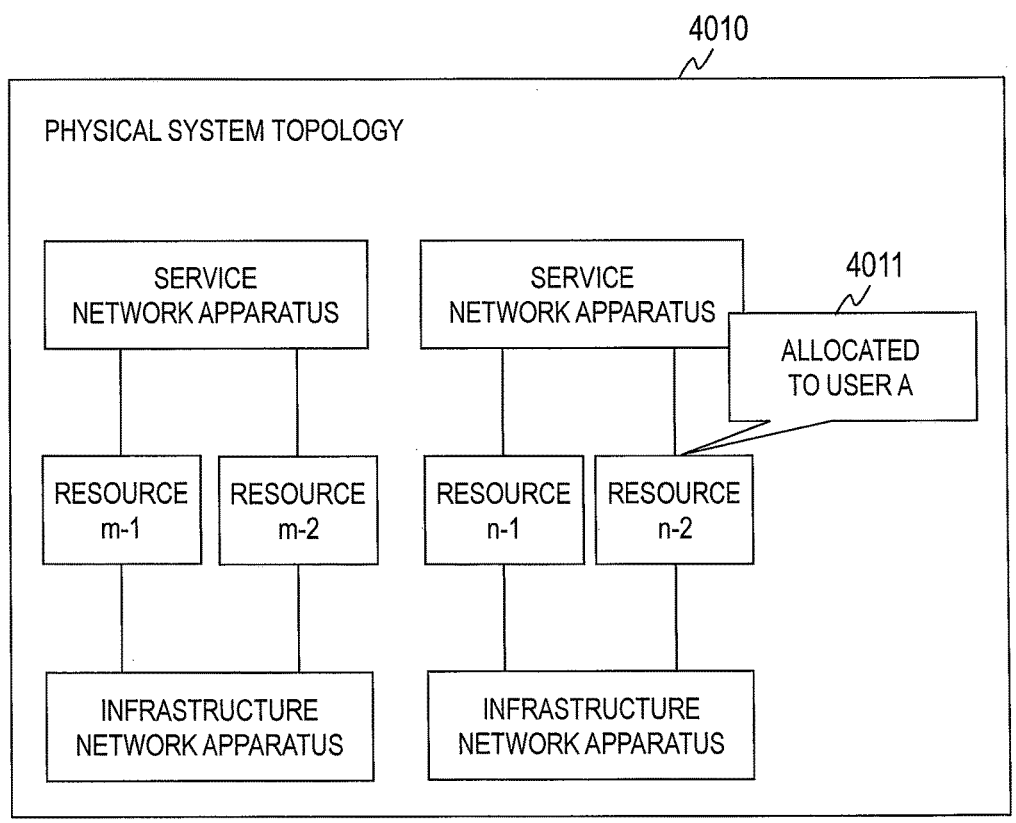
FIG. 28A is a diagram illustrating an example of a screen that is displayed for the resource manager on the resource management apparatus according to the first embodiment.
FIG. 28B is a diagram illustrating an example of a screen that is displayed for the resource manager on the resource management apparatus according to the first embodiment.

FIGS. 28A and 28B are diagrams each illustrating an example of a screen that is displayed for the resource manager on the resource management apparatus 5. The resource manager may operate the resource management apparatus 5 with the input unit 504 and the display unit 503 via a CLI or an API, instead of the GUI of FIGS. 28A and 28B.

In FIG. 28A, a screen 4000 is a screen showing a resource list which is output to the display unit 503 of the resource management apparatus 5.

A resource ID 4001 displayed in the screen 4000 is information for uniquely identifying a resource (an identifier). A resource type 4002 is information that indicates a resource type, such as "host computer", "appliance", or "storage". A resource user 4003 is information for uniquely identifying a resource user (an identifier).

In FIG. 28B, a screen 4010 is a screen showing the physical topology of the computer system of FIG. 2, and is for explicitly showing the overall configuration of FIG. 2. A pop-up 4011 in the screen 4010 displays information on a resource user who is allocated a resource.

Figure 29A:
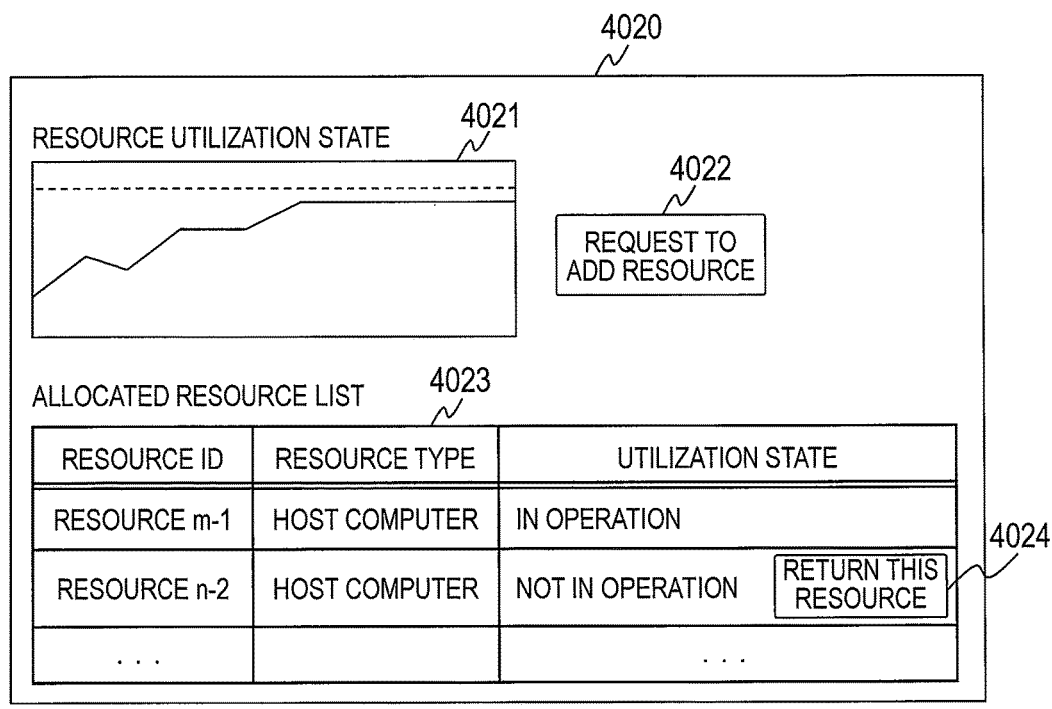
FIG. 29A is a diagram illustrating an example of a screen that is displayed for a resource user on the resource management apparatus according to the first embodiment.
Figure 29B:
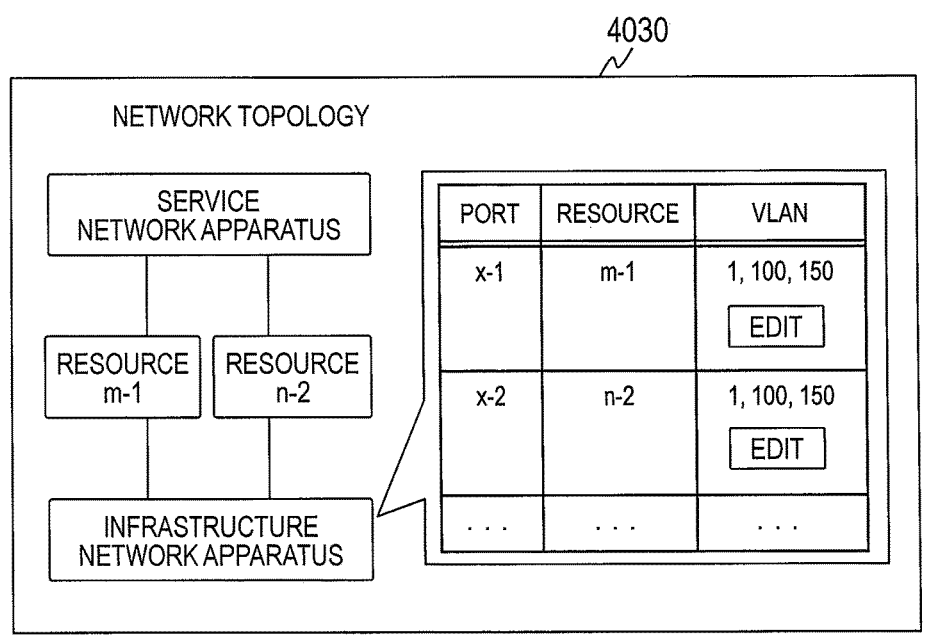
FIG. 29B is a diagram illustrating an example of a screen that is displayed for a resource user on the resource management apparatus according to the first embodiment.

FIGS. 29A and 29B are diagrams each illustrating an example of a screen that is displayed for a resource user on the resource management apparatus 5. The screen in the example is one to be presented to a certain resource user. The resource user may operate the resource management apparatus 5 via a CLI or an API.

In FIG. 29A, a screen 4020 is a screen showing the actual resource utilization state of this resource user. A graph 4021 shows the proportion of resources that are actually in use to all resources allocated to the resource user. A "request to add a resource" button 4022 is for transmitting a resource addition request to the resource management apparatus 5. An allocated resource list 4023 is a list of resources allocated to the resource user and also shows, for each of the resources, the utilization state of the resource. A "return a resource" button 4024 is for transmitting to the resource management apparatus 5 a request to receive an unused resource that is about to be returned.

In FIG. 29B, a screen 4030 is a screen showing a computer system topology that is recognized by the terminal 8 of this resource user, and is for displaying the logical computer resource configuration of FIG. 3. This topology shows a computer resource configuration that can be manipulated by the resource user.

The first embodiment has now been described. The data center resource allocation system according to the first embodiment provides resource groups that are configured from flexibly combined resources 1 to individual uses in the data center infrastructure 4, which includes at least one data center, by controlling, in a centralized manner, with the resource management apparatus 5, network apparatus to which the resources 1 are coupled, and virtualizing the logical infrastructure networks 72 in conjunction with the logical service networks 71. In other words, the resource management apparatus 5 can configure, for each different use (cloud service, business application, etc.), a resource set that is separated from another resource set logically to provide the resource set to the terminals 8 of resource users, by coupling the resources 1 via the virtualized logical service networks 71 and logical infrastructure networks 72.

In addition, the data center resource allocation system abstracts a network on a use-by-use basis and flexibly provides, for each different use, a resource group that is separated from another resource group logically, by virtualizing the logical infrastructure networks 72 in conjunction with the logical service networks 71, and providing logical network apparatus that couple resources to one another.

The data center resource allocation system further provides interfaces (APIs or the like) for changing the resource configuration and the logical network configuration in the resource management apparatus 5 and in logical network apparatus, thereby adding/returning a resource and changing the logical network configuration among resources on demand on a use-by-use basis, and controlling so that the resource addition/return and the configuration change are reflected on physical networks.

Second Embodiment

Figure 30:
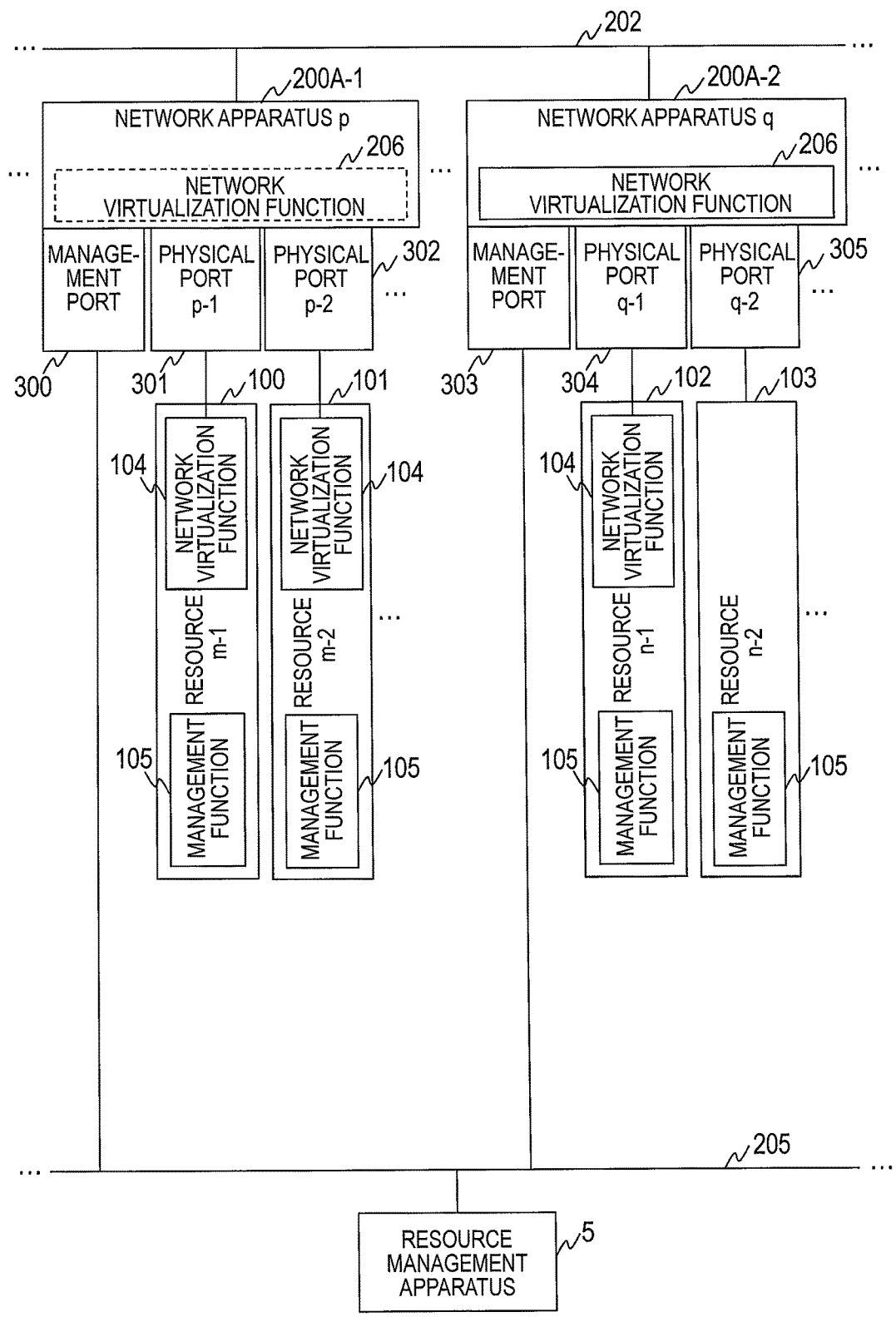
FIG. 30 is a block diagram illustrating an example of the overall configuration of a data center resource allocation system according to a second embodiment.

FIG. 30 is a block diagram illustrating an example of the overall configuration of a data center resource allocation system according to a second embodiment.

In the second embodiment, the service network apparatus 200 and infrastructure network apparatus 203 of the first embodiment are not separated physically, and one type of network apparatus 200A handle communication of the service network 2 and communication of the infrastructure network 3. The rest of the configuration of the second embodiment is the same as that of the first embodiment.

Figure 31:
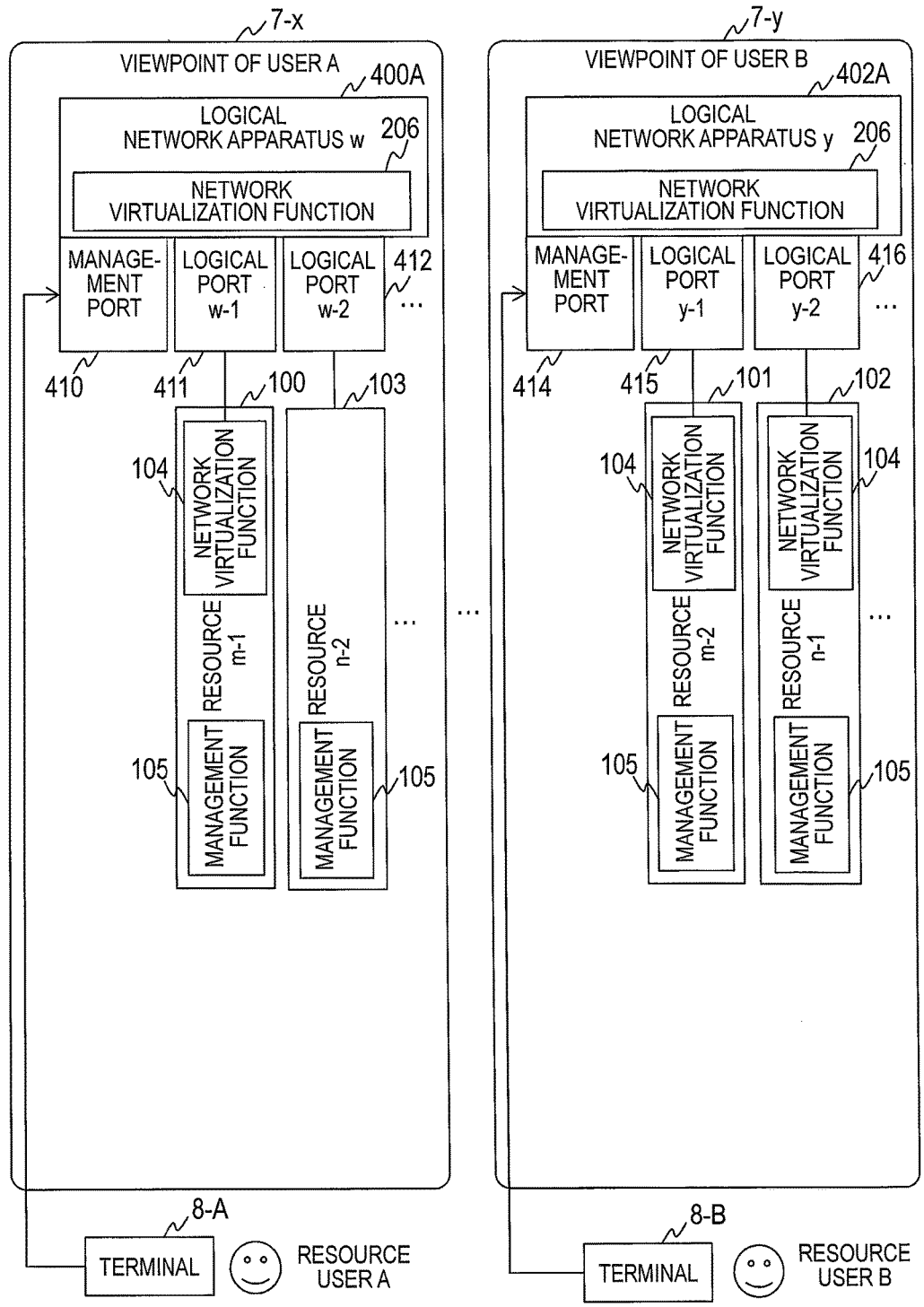
FIG. 31 is a logical block diagram of a computer system that is recognized by the terminals of resource users in the data center resource allocation system according to the second embodiment.

FIG. 31 is a logical block diagram of a computer system that is recognized by the terminals 8 of resource users in the data center resource allocation system. Logical network apparatus 400A and 402A control communication of the service network 2 and communication of the infrastructure network 3, in place of the logical service network apparatus 400 and 402 and logical infrastructure network apparatus 401 and 403 of the first embodiment which are illustrated in FIG. 3.

Thus, applying this invention also enables the configuration where the logical network apparatus 400A and 402A controls communication of the service network 2 and communication of the infrastructure network 3 to provide combined resources of a plurality of data centers quickly, flexibly, and inexpensively for a plurality of uses (cloud service, business application, etc.).

Some or all of the components, processing units, processing means and the like of the computer or others described in this invention may be implemented by dedicated hardware.

The various types of software, examples of which are given in the embodiments, can be stored in various recording media (for example, a non-transitory storage medium), such as electromagnetic recording media, electronic recording media, and optical recording media, and can be downloaded to a computer via a communication network such as the Internet.

Although the present disclosure has been described with reference to exemplary embodiments, those skilled in the art will recognize that various changes and modifications may be made in form and detail without departing from the spirit and scope of the claimed subject matter. For instance, the embodiments are described in detail for easier understanding, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description, and not all of control lines and information lines of a product are mentioned. In actuality, it can be considered that almost all components are coupled to one another.

What is claimed is:

1. A system for allocating resources of a data center, the data center comprising:
   a data center infrastructure comprising at least one service network accessed by a terminal of a logical infrastructure user and a terminal of a resource user, at least one infrastructure network accessed by the terminal of the resource user, and at least one resource coupled to the at least one service network and the at least one infrastructure network; and
   a resource management apparatus for managing the at least one infrastructure network, the at least one service network, and the at least one resource,
   the resource management apparatus being configured to:
   generate, in response to a request from the terminal of the resource user, a logical service network, which is created by virtualizing the service network, a logical infrastructure network, which is created by virtualizing the infrastructure network, and a logical infrastructure in which the at least one resource is allocated to the logical service network and the logical infrastructure network; and
   provide the generated logical infrastructure to the terminal of the logical infrastructure user,
   wherein the service network comprises a service network apparatus, which includes a network virtualization function,
   wherein the infrastructure network comprises an infrastructure network apparatus, which has a network virtualization function, and
   wherein the resource management apparatus:
   generates the logical service network using the network virtualization function of the service network apparatus and the logical service network uses physical resources of the service network apparatus, generates logical infrastructure network using the network virtualization function of the infrastructure network apparatus, and the logical infrastructure network uses physical resources of the infrastructure network apparatus, generates and provides, to the terminal of the resource user, a logical network apparatus, which constructs the logical service network and the logical infrastructure network, stores, for each resource user, predetermined resource use information, obtains, for each resource user, a utilization state of resources allocated to the resource user, determines whether respective resource users are in excess of use of resources based the predetermined resource use information, upon determining that a resource user is in excess of use of the resources, send a message to an interface of the logical network apparatus suggesting a return of a resource, and upon acceptance of the return of the resource from the resource user by the terminal of the resource user, changes allocation settings of the identified resource to return the identified resource.

2. The data center resource allocation system according to claim 1, wherein, in response to a request from the terminal of the resource user, the resource management apparatus allocates the at least one resource to the logical service network and the logical infrastructure network, which are created through virtualization, thereby configuring, for each different use, a set of the at least one resource which is separated logically from another resource set, and providing the resource set to the terminal of the resource user.

3. The data center resource allocation system according to claim 1, wherein the resource management apparatus generates, for the terminal of the resource user, an interface for controlling the logical service network apparatus.

4. A method of allocating resources of a data center, the data center comprising:
a data center infrastructure comprising at least one service network accessed by a terminal of a logical infrastructure user and a terminal of a resource user, at least one infrastructure network accessed by the terminal of the resource user, and at least one resource coupled to the at least one service network and the at least one infrastructure network; and
a resource management apparatus for managing the at least one infrastructure network, the at least one service network, and the at least one resource,
the method comprising:
generating, by the resource management apparatus, in response to a request from the terminal of the resource user, a logical service network, which is created by virtualizing the service network, and a logical infrastructure network, which is created by virtualizing the infrastructure network;

generating, by the resource management apparatus, in response to a request from the terminal of the resource user, a logical infrastructure in which the at least one resource is allocated to the logical service network and the logical infrastructure network; and providing, by the resource management apparatus, the generated logical infrastructure to the terminal of the logical infrastructure user, wherein the service network comprises a service network apparatus, which includes a network virtualization function, wherein the infrastructure network comprises an infrastructure network apparatus, which has a network virtualization function, and wherein the method further comprises the steps, performed by the resource management apparatus, of:
generating the logical service network using the network virtualization function of the service network apparatus and the logical service network uses physical resources of the service network apparatus, generating logical infrastructure network using the network virtualization function of the infrastructure network apparatus, and the logical infrastructure network uses physical resources of the infrastructure network apparatus, generating and providing, to the terminal of the resource user, a logical network apparatus, which constructs the logical service network and the logical infrastructure network, storing, for each resource user, predetermined resource use information, obtaining, for each resource user, a utilization state of resources allocated to the resource user, determining whether respective resource users are in excess of use of resources based the predetermined resource use information, upon determining that a resource user is in excess of use of the resources, sending a message to an interface of the logical network apparatus suggesting a return of a resource, and upon acceptance of the return of the resource from the resource user by the terminal of the resource user, changing allocation settings of the identified resource to return the identified resource.

5. The data center resource allocation method according to claim 4, wherein the step of generating, by the resource management apparatus, the logical infrastructure comprises allocating, by the resource management apparatus, in response to a request from the terminal of the resource user, the at least one resource to the logical service network and the logical infrastructure network, which are created through virtualization, thereby configuring, for each different use, a set of the at least one resource which is separated logically from another resource set, and providing the resource set to the terminal of the resource user.

* * * * *